(12) United States Patent
Sekino

(10) Patent No.: US 9,091,374 B2
(45) Date of Patent: Jul. 28, 2015

(54) TUBE COUPLING JOINT

(75) Inventor: Yohei Sekino, Kanagawa (JP)

(73) Assignee: FLOWELL CORPORATION, Kanagawa (JP)

( * ) Notice: Subject to any disclaimer, the term of this patent is extended or adjusted under 35 U.S.C. 154(b) by 0 days.

(21) Appl. No.: 13/982,164

(22) PCT Filed: Jan. 31, 2012

(86) PCT No.: PCT/JP2012/052057
§ 371 (c)(1),
(2), (4) Date: Jul. 26, 2013

(87) PCT Pub. No.: WO2012/105525
PCT Pub. Date: Aug. 8, 2012

(65) Prior Publication Data
US 2013/0307265 A1    Nov. 21, 2013

(30) Foreign Application Priority Data
Feb. 4, 2011  (JP) .................................. 2011-022553

(51) Int. Cl.
| F16L 47/04 | (2006.01) |
| F16L 19/04 | (2006.01) |
| F16L 19/028 | (2006.01) |
| F16L 33/22 | (2006.01) |

(52) U.S. Cl.
CPC ............. *F16L 19/04* (2013.01); *F16L 19/0283* (2013.01); *F16L 33/226* (2013.01); *F16L 47/04* (2013.01)

(58) Field of Classification Search
CPC .................................. F16L 47/04; F16L 19/04
USPC ........................ 285/247, 245, 246, 334.5, 331
See application file for complete search history.

(56) References Cited

U.S. PATENT DOCUMENTS

| 4,500,118 | A | * | 2/1985 | Blenkush | 285/247 |
| 5,370,424 | A | * | 12/1994 | Wendorff | 285/247 |
| 5,388,871 | A | * | 2/1995 | Saitoh | 285/247 |
| 5,743,572 | A | * | 4/1998 | Nishio | 285/331 |
| 6,022,053 | A | * | 2/2000 | Hukuda | 285/331 |
| 6,045,164 | A | * | 4/2000 | Nishio | 285/331 |
| 6,193,239 | B1 | * | 2/2001 | Fukano et al. | 285/354 |
| 6,435,568 | B1 | * | 8/2002 | Fukano et al. | 285/331 |
| 6,513,839 | B2 | * | 2/2003 | Nishio | 285/331 |
| 6,776,440 | B2 | * | 8/2004 | Nishio | 285/331 |

(Continued)

FOREIGN PATENT DOCUMENTS

| JP | 06-014674 U | 2/1994 |
| JP | 3041899 U | 7/1997 |
| JP | 10-252968 A | 9/1998 |

(Continued)

*Primary Examiner* — David E Bochna
(74) *Attorney, Agent, or Firm* — Kubotera & Associates, LLC

(57) ABSTRACT

By previously press-fitting a ring (40) into one end portion (12) of a tube (11), the one end portion (12) is held in the flared state. With an inner cylindrical portion (22) of the joint main body (20) having been inserted into this ring (40) while the one end portion (12) having been press-fitted into a recessed groove (21) to the innermost recess portion, a greatest wall thickness portion (41) of the ring is covered. In this state, with a cap nut (30) being screwed with the joint main body (20), the greatest wall thickness portion (41) of the ring is pressed against the inner cylindrical portion (22) together with the one end portion (12) through an outer cylindrical portion (23), and a hole peripheral edge (34*a*) of an insertion hole (34) of the cap nut is pressure-contacted with a bent portion (12*c*) of the tube by the ring (40).

5 Claims, 17 Drawing Sheets

(56) References Cited

U.S. PATENT DOCUMENTS

| | | | |
|---|---|---|---|
| 6,896,299 B1 * | 5/2005 | Nishio | 285/331 |
| 6,971,683 B2 * | 12/2005 | Mizukoshi | 285/247 |
| 6,991,266 B2 * | 1/2006 | Nishio | 285/331 |
| 7,240,925 B2 * | 7/2007 | Fukano et al. | 285/247 |
| 8,096,586 B2 * | 1/2012 | Fujii et al. | 285/247 |

FOREIGN PATENT DOCUMENTS

| | | |
|---|---|---|
| JP | 10-318475 A | 12/1998 |
| JP | 11-182751 A | 7/1999 |

\* cited by examiner

φP < φQ (a)

(b)

F I G . 12
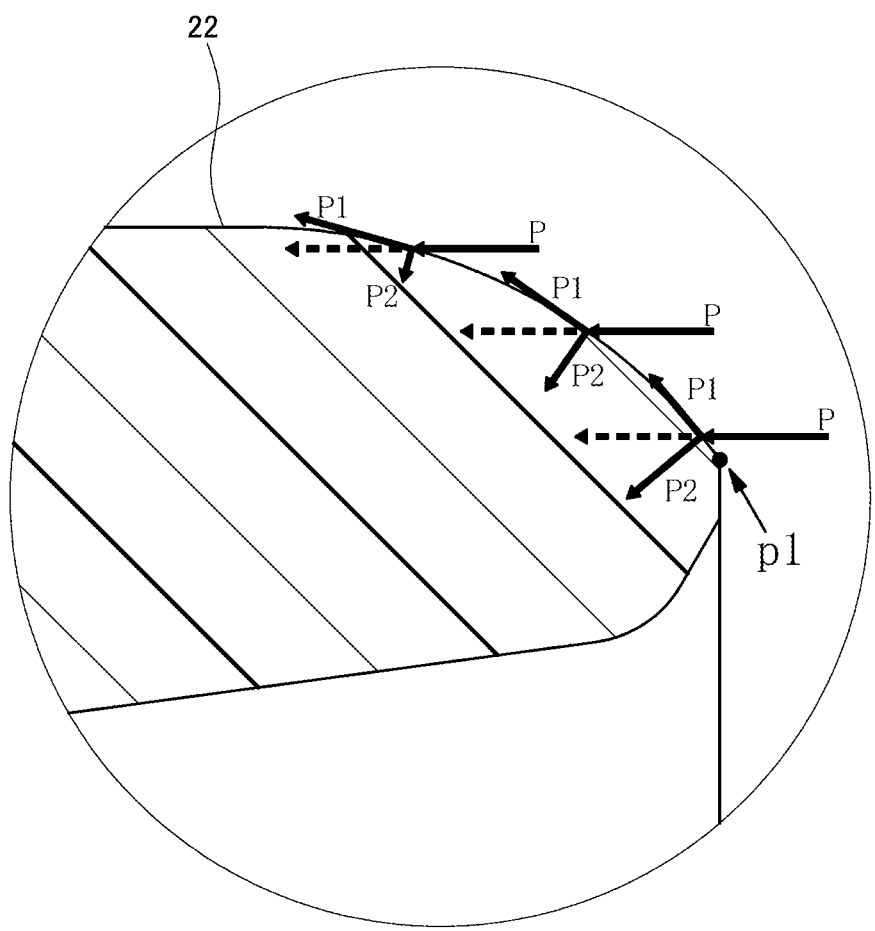

F I G . 16
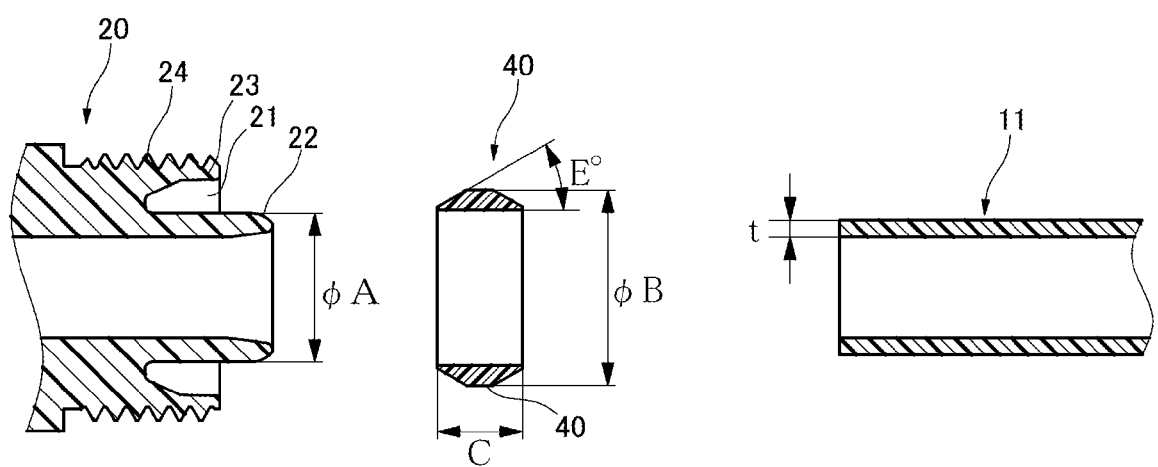

Portion at either end of ring where fluid is easy to penetrate, and inside diameter can be deformed to cause pressure drop of fluid.

End of joint main body is locally deformed inward, thereby causing a pressure drop of fluid.

Joint main body  Cap nut  Tube

Such a way of coupling is allowed, which can cause tube to be easily dropped off, leading to an accident.

$\theta 2$

FIG. 24

| $\theta 1(°)$ | WHETHER OR NOT THE $\theta 1$ IS EFFECTIVE FOR LOCAL DEFORMATION SUPPRESSION |
|---|---|
| 1 | NOT EFFECTIVE |
| 2 | NOT EFFECTIVE |
| 3 | EFFECTIVE |
| 4 | EFFECTIVE |
| 5 | EFFECTIVE |
| 6 | EFFECTIVE |
| 7 | EFFECTIVE |
| 8 | EFFECTIVE |
| 9 | EFFECTIVE |
| 10 | EFFECTIVE |
| 11 | EFFECTIVE |
| 12 | EFFECTIVE |
| 13 | EFFECTIVE |
| 14 | EFFECTIVE |
| 15 | EFFECTIVE |
| 16 | EFFECTIVE |
| 17 | EFFECTIVE |
| 18 | NOT EFFECTIVE |
| 19 | NOT EFFECTIVE |
| 20 | NOT EFFECTIVE |

TUBE COUPLING JOINT

TECHNICAL FIELD

The present invention is related to a tube coupling joint for use as means for coupling tubes to one another that provide flow paths for any fluids including ultrapure water, which is handled in various processes, such as those for semiconductor manufacturing, liquid crystal manufacturing, medical supply/pharmaceutical manufacturing, food processing, and the like, and fluids dangerous to human bodies, such as sulfuric acid and hydrochloric acid.

BACKGROUND ART

Conventionally, as this type of tube coupling joints, those made of a resin, which is typified by a fluorocarbon resin, are well known, and they are divided into two broad general categories; i.e., the "inner ring type" as shown in FIG. 19, which inserts a ring into the inside of the tube, and the "flare type" as shown in FIG. 20, which flares the tube.

As the tube coupling joint of inner ring type, that as disclosed in Patent Document 1 is known, and as the tube coupling joint of flare type, that as disclosed in Patent Document 2 is known. The tube coupling joints of these types have their inherent advantages and disadvantages.

Advantages of the inner ring type include that, once the ring is inserted into the tube, processing of the tube is completed, thus excellent assemblability being assured, and that, when the tube is subjected to a tensile load, the ring serves to prevent the tube from coming off, thus a high tensile strength being provided.

The advantages of the flare type include that the coupling portion of the tube and that of the joint main body are pressure-contacted with each other by means of the cap nut, resulting in no gap being produced, thereby the possibility of penetration of the fluid being low, and that, unless the tube is positively flared, the tube cannot be mounted to the joint main body, whereby a mistake leading to an accident can be prevented.

CITATION LIST

Patent Literature

Patent Document 1: Japanese Unexamined Patent Application Publication No. 10-318475
Patent Document 2: Japanese Unexamined Patent Application Publication No. 11-182751

SUMMARY OF INVENTION

However, with the aforementioned conventional general inner ring type (FIG. 19 to be referenced), there have been problems that both ends of the ring inserted into the tube tend to cause penetration of the fluid, and residence of the fluid. Further, another problem has been presented that the ring is deformed to an inside diameter smaller than that of the tube, thereby causing a pressure drop in transportation of the fluid.

Still further, another problem has been presented that, even if the ring has not been inserted into the tube, the tube can be incorporated into the joint main body, as shown in FIG. 21, and whether or not the ring has been inserted into the tube cannot be known from the outside, therefore, in the event that the ring has not been inserted into the tube, the tube may be drawn with no resistance to the drawing, resulting in occurrence of an accident.

Such problems presented by the conventional general inner ring type can be solved by the tube coupling joint as disclosed in the Patent Document 1 as mentioned above. However, even with the tube coupling joint as disclosed in Patent Document 1, in the event that a vibration is applied to the joint, or a tensile force is applied to the tube, it is inevitable that the flaring ring and the tube are displaced. Thus, there have been problems that the seal performance becomes unstable, and the tensile strength of the tube is deteriorated.

On the other hand, with the aforementioned conventional general flare type (FIG. 20 to be referenced) as well as the tube coupling joint as disclosed in Patent Document 2, it is required to hold the tube in a flared geometry in order to mount the tube to the joint main body. Therefore, the operation of flaring the tube must be repeated as many as 3 to 10 times, thereby a significant amount of effort is required for this operation, and thus there has been a problem of poor assemblability. In addition, there has been another problem that the tensile strength exerted when a tensile load is imposed on the tube tends to be low as compared to that which is exerted by the inner ring type.

Further, with the flare type, there has been another problem that the distal end portion of the joint main body is deformed inwardly to thereby cause a pressure drop in transportation of the fluid, although the pressure drop is low, as compared to that which is caused by the inner the ring type. For the flare type, as shown in FIG. 22, a taper at an inclination angle of θ2 has been provided for the bore in the distal end portion of the joint main body such that no gap is produced at the boundary face between the tube and the joint main body, thereby preventing penetration and residence of the liquid, however, as shown in FIG. 20, the distal end portion of the joint main body has caused a local deformation toward the bore center.

Such a deformation has caused the flow of the fluid to be hindered, or has resulted in a pressure drop. Moreover, such a deformation may cause fine bubbles, called microbubbles, to be generated, resulting from the turbulence of the flow of the fluid. Such microbubbles have presented a big problem, because they can cause a defective semiconductor item to be produced in the semiconductor manufacturing process.

The present invention has been made in view of the above problems with each of the conventional inner ring type and the flare type, and it is an object of the present invention to provide a tube coupling joint which can minimize the liquid residence in the inner portion and the pressure drop in transportation of the liquid, and can simplify the assembling operation to thereby achieve the cost reduction, allowing the quality and the reliability to be improved, and especially, sufficiently preventing the ring and the tube from being displaced, whereby the seal performance can be stabilized, and the tensile strength of the tube can be enhanced.

The subject matters of the present invention to achieve the above object are disclosed in the following respective aspects of the present invention:

[1]. A tube coupling joint, a ring being press-fitted into one end portion of a tube for flaring it while holding it in the flared state, the flared one end portion of the tube being coupled to a joint main body, and with the tube having been passed therethrough, a cap nut surrounding the flared one end portion being tightened to the joint main body for fixing the tube to the joint main body, the cap nut including a threaded hole for accommodating the flared one end portion of the tube; an internal thread portion formed on the inner periphery of the threaded hole; a recess wall provided in the innermost recess portion of the threaded hole; and an insertion hole penetrating through the recess wall for passing the tube therethrough, the joint main body including, on one end portion side thereof where the cap nut is to be tightened, an annular recessed groove for fitting the flared one end portion of the tube thereinto; an inner cylindrical portion provided inside of the recessed groove for fitting the flared one end portion of the tube thereonto; an outer cylindrical portion provided outside of the recessed groove for fitting the flared one end portion of the tube thereinto; an external thread portion formed on the outer periphery of the outer cylindrical portion to be screwed with the internal thread portion; and a thru-hole provided inside of the inner cylindrical portion so as to penetrate therethrough in a screw axial direction, having substantially the same hole diameter as the inside diameter of the tube, the ring being formed in a sectional geometry providing the largest diameter for the outer periphery thereof on the central side rather than at both ends, and being positioned with a greatest wall thickness portion, providing the largest diameter, being engaged with the inner periphery of the one end portion of the tube with the ring being press-fitted thereto so as to cut its way thereinto, upon the inner cylindrical portion of the joint main body having been inserted into the ring while the flared one end portion of the tube having been press-fitted to the innermost recess portion of the recessed groove, the outer cylindrical portion covering at least the greatest wall thickness portion of the ring, and in this state, the internal thread portion of the cap nut being screwed with the external thread portion of the joint main body for pressing the greatest wall thickness portion of the ring against the inner cylindrical portion together with the one end portion of the tube through the outer cylindrical portion, having the external thread portion, and for pressure-contacting a hole peripheral edge of the insertion hole in the cap nut with a bent portion of the tube where the flaring by the ring is brought to an end.

[2]. The tube coupling joint set forth in item [1], wherein the outer cylindrical portion of the joint main body is formed such that, upon the inner cylindrical portion of the joint main body having been inserted into the ring while the flared one end portion of the tube having been press-fitted to the innermost recess portion of the recessed groove, a distal end portion extends to a position where it covers the entire ring, getting over the greatest wall thickness portion of the ring, and the cap nut has a projected annular area around the recess wall that is jutted out in a mountain-shaped sectional geometry toward the central axis and the inlet of the threaded hole, and upon the cap nut being tightened to the joint main body, presses the distal end portion of the outer cylindrical portion against the one end portion of the ring.

[3]. The tube coupling joint set forth in item [1] or [2], wherein the hole peripheral edge of the insertion hole in the cap nut is jutted out in a mountain-shaped sectional geometry toward the central axis and the inlet of the threaded hole, and the bent portion of the tube is sandwiched between the hole peripheral edge of the insertion hole and the distal end portion of the inner cylindrical portion.

[4]. The tube coupling joint set forth in item [1], [2] or [3], wherein the inside diameter of the outer cylindrical portion of the joint main body is set at a value smaller than the largest outside diameter of the one end portion of the tube flared by the greatest wall thickness portion of the ring, and by tightening the cap nut to the joint main body, the flared one end portion of the tube is press-fitted to the innermost recess portion of the recessed groove.

[5]. The tube coupling joint set forth in item [1], [2], or [4], wherein, on the inner periphery side of the distal end portion of the inner cylindrical portion of the joint main body, there are provided a first inner tapered portion which is formed by chamfering inner cylindrical portion by a thickness equal to an amount by which the distal end portion would be deformed toward the central axis with the cap nut being tightened to the joint main body, and a second inner tapered portion inclined, on the distal end side of the first inner tapered portion, at an angle equal to or larger than the inclination angle thereof for preventing residence of a fluid as a medium to be transported.

[6]. The tube coupling joint set forth in item [1], [2], [3], [4] or [5], wherein, on the outer periphery side of the distal end portion of the inner cylindrical portion of the joint main body, there is provided an outer tapered portion which, by tightening the cap nut to the joint main body, is pressure-contacted with the inner periphery of the bent portion of the tube for holding the airtightness, and the outer tapered portion is formed in a rounded sectional geometry.

Said present invention functions as follows.

According to the tube coupling joint set forth in the above item [1], before coupling one end portion of the tube to the joint main body, the ring for flaring the one end portion of the tube while holding it in the flared state is previously press fitted thereinto.

The ring prevents the flared one end portion of the tube from being shrunk, and the one end portion of the tube in such a flared state can be easily press-fitted into the recessed groove, with it being easily fitted onto the inner cylindrical portion of the joint main body while being fitted into the outer cylindrical portion thereof. In this way, at the time of coupling the tube with the joint main body, there is no need for using a jig.

Said ring is formed in a sectional geometry providing the largest diameter for the outer periphery thereof on the central side rather than at both ends, and is positioned with the greatest wall thickness portion, providing the largest diameter, being engaged with the inner periphery of the one end portion of the tube with the ring being press-fitted thereto so as to cut its way thereinto. In this way, by positioning the ring in place, occurrence of such an event as that of the ring getting in an inner portion of the tube or coming off from the tube can be avoided.

When the inner cylindrical portion of the joint main body has been inserted into the ring, while the flared one end portion of the tube has been press-fitted to the innermost recess portion of the recessed groove, the outer cylindrical portion covers at least the greatest wall thickness portion of the ring.

And in this state, when the internal thread portion of the cap nut is screwed with the external thread portion of the joint main body, the greatest wall thickness portion of the ring is pressed against the inner cylindrical portion together with the one end portion of the tube through the outer cylindrical portion, having the external thread portion, and the hole peripheral edge of the insertion hole in the cap nut is pressure-contacted with the bent portion of the tube where the flaring by the ring is brought to an end.

Therefore, the gap between any two portions adjacent to each other of the distal end portion of the inner cylindrical portion of the joint main body, the hole peripheral edge of the insertion hole in the cap nut, and the bent portion of the tube is removed to provide a sufficiently tight contact state, whereby the tube can be rigidly coupled and fixed to the joint main body.

Especially, since the greatest wall thickness portion of the ring, the one end portion of the tube, and in addition the outer cylindrical portion of the joint main body are overlapped one another on the inner cylindrical portion in the axial direction, and thus even when a vibration is applied to the joint main body, or a tensile force is applied to the tube, the ring and the tube can be sufficiently prevented from being displaced, whereby the seal performance can be stabilized, and the tensile strength of the tube can be enhanced.

According to the tube coupling joint set forth in the above item [2], the outer cylindrical portion of the joint main body is formed such that, when the inner cylindrical portion of the joint main body has been inserted into the ring, while the flared one end portion of the tube has been press-fitted to the innermost recess portion of the recessed groove, the distal end portion of the outer cylindrical portion extends to a position where it covers the entire ring, getting over the greatest wall thickness portion of the ring.

Thus, the entire one end portion of the tube flared by the ring is covered by the outer cylindrical portion of the joint main body so as to be surrounded thereby. In this state, when the cap nut is screwed with the joint main body, the projected annular area provided around the recess wall of the cap nut presses the distal end portion of the outer cylindrical portion against the one end portion of the ring. Therefore, the inlet of the recessed groove is narrowed to be blocked, resulting in the one end portion of the tube that has been flared by the ring being confined in the recessed groove, whereby the seal performance and the tensile strength can be further enhanced.

According to the tube coupling joint set forth in the above item [3], the hole peripheral edge of the insertion hole in the cap nut is jutted out in a mountain-shaped sectional geometry toward the central axis and the inlet of the threaded hole, and the bent portion of the tube is sandwiched between the hole peripheral edge of the insertion hole and the distal end portion of the inner cylindrical portion of the joint main body. Thereby, the tensile strength of the tube with respect to the joint main body is further increased, whereby the tube can be more positively prevented from accidentally coming off.

According to the tube coupling joint set forth in the above item [4], the inside diameter of the outer cylindrical portion of the joint main body is set at a value smaller than the largest outside diameter of the one end portion of the tube flared by the greatest wall thickness portion of the ring. And, with the cap nut to the joint main body being tightened, the flared one end portion of the tube is press-fitted to the innermost recess portion of the recessed groove of the cap nut, thereby, the seal performance can be further stabilized to enhance the airtightness.

According to the tube coupling joint set forth in the above item [5], on the inner periphery side of the distal end portion of the inner cylindrical portion of the joint main body, there are provided a first inner tapered portion which is formed by chamfering the inner cylindrical portion by a thickness equal to an amount by which the distal end portion would be deformed toward the central axis with the cap nut being tightened to the joint main body, and a second inner tapered portion inclined, on the distal end side of the first inner tapered portion, at an angle equal to or larger than the inclination angle thereof for preventing residence of a fluid as a medium to be transported. The tapered geometry of the first inner tapered portion is not limited to a single-tapered one, and may be a multiple-tapered geometry, such as a double- or triple-tapered one.

If the inner cylindrical portion of the joint main body is locally deformed in a direction toward the bore center of the thru-hole, the flow of the fluid is hindered by the deformation, however, by providing the first inner tapered portion, the inner cylindrical portion, even when locally deformed toward the bore, will not form a convex by which the flow of the fluid is hindered. By providing the first inner tapered portion and the second inner tapered portion, penetration of the fluid and liquid residence can be prevented with local convex bulging which will obstruct the flow of the fluid being suppressed.

According to the tube coupling joint set forth in the above item [6], on the outer periphery side of the distal end portion of the inner cylindrical portion of the joint main body, there is provided an outer tapered portion which, by tightening the cap nut to the joint main body, is pressure-contacted with the inner periphery of the bent portion of the tube for holding the airtightness, and the outer tapered portion is formed in a rounded sectional geometry. Thus, by providing the outer tapered portion with a rounded sectional geometry, it becomes possible to prevent leakage and penetration of the fluid inside the joint, especially, between the distal end portion of the inner cylindrical portion and the bent portion of the tube without increasing the tightening torque of the cap nut.

With the tube coupling joint according to the present invention, the problems with each of the conventional inner ring type and the flare type can be solved, the liquid residence in the inner portion and the pressure drop in transportation of the liquid being able to be minimized, the assembling operation being able to be simplified to thereby achieve the cost reduction, the quality and the reliability being able to be improved, and especially, the ring and the tube being able to be sufficiently prevented from being displaced, whereby the seal performance can be stabilized, and the tensile strength of the tube can be enhanced.

BRIEF DESCRIPTION OF DRAWINGS

FIG. 12 is an explanatory drawing illustrating the importance of a rounded sectional geometry in the outer tapered portion of the inner cylindrical portion in the tube coupling joint according to the first embodiment of the present invention;

FIG. 16 is an explanatory drawing illustrating the dimensions of the respective parts of the tube coupling joint according to the first embodiment of the present invention;

FIG. 24 is a chart which gives experimental data for establishing the proper inclination angle of the first inner tapered portion of the inner cylindrical portion of the joint main body in the tube coupling joint according to the present embodiment.

MODES FOR CARRYING OUT THE INVENTION

Hereinbelow, embodiments which represent the present invention will be explained with reference to the drawings.

FIG. 1 to FIG. 16 illustrate a first embodiment of the present invention.

Figure 1:
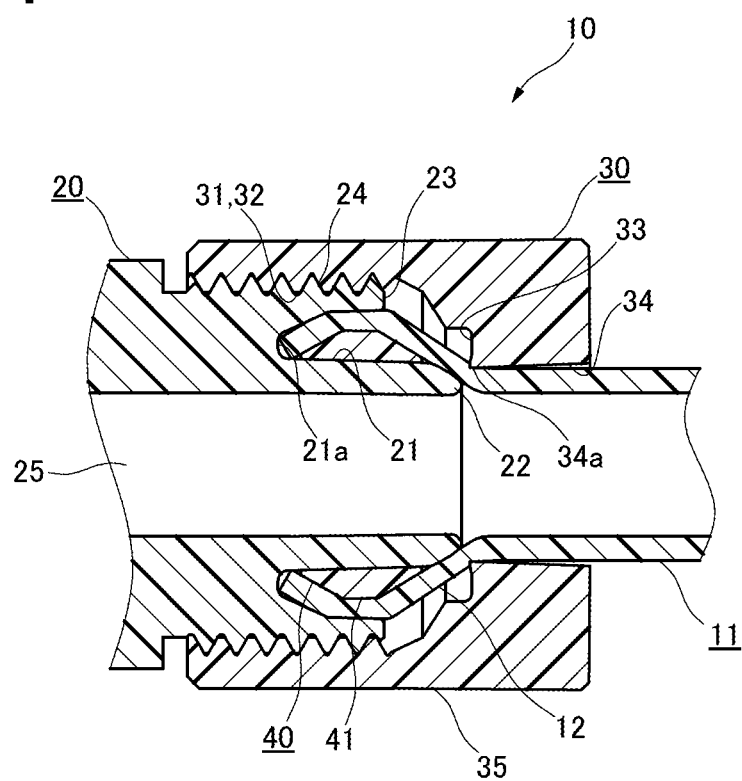
FIG. 1 is a critical portion sectional view showing a tube coupling joint according to a first embodiment of the present invention.
Figure 2:
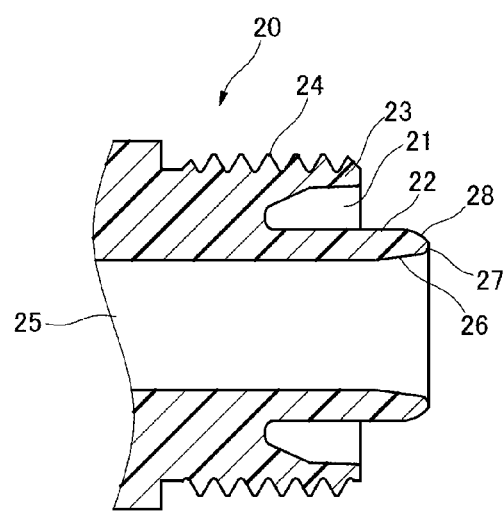
FIG. 2 is a sectional view showing one end portion of a joint main body as a component part of the tube coupling joint according to the first embodiment of the present invention.
Figure 3:
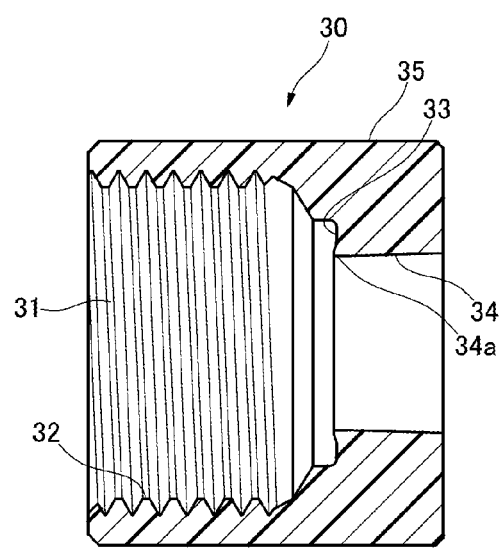
FIG. 3 is a sectional view showing a cap nut as a component part of the tube coupling joint according to the first embodiment of the present invention.
Figure 4:
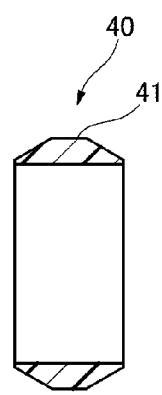
FIG. 4 is a sectional view showing a ring as a component part of the tube coupling joint according to the first embodiment of the present invention.

FIG. 1 is a critical portion sectional view showing a tube coupling joint 10 according to the present embodiment; FIG. 2 is a sectional view of one end portion of a joint main body 20 of the tube coupling joint 10; FIG. 3 is a sectional view of a cap nut 30 in the tube coupling joint 10; FIG. 4 is a sectional view of a ring 40 in the tube coupling joint 10 and FIG. 5 is a perspective view showing the appearance of the tube coupling joint 10.

As shown in FIG. 1 to FIG. 5, the tube coupling joint 10 is constituted by a combination of a tube 11, the joint main body 20, the cap nut 30 and the ring 40. With such tube coupling joint 10, the ring 40 is press-fitted to one end portion 12 of the tube 11 for flaring it and holding it in the flared state; the flared one end portion 12 of the tube 11 is coupled to the joint main body 20; and with the tube 11 having been passed through the cap nut 30, the cap nut 30 surrounding the flared one end portion 12 is tightened to the joint main body 20, thereby the tube 11 is fixed to the joint main body 20.

As shown in FIG. 1, the tube 11 is a cylindrical tube the inside of which is hollow. As the material of the tube 11, such a material as a fluorocarbon resin which is typified by the PTFE (polytetrafluoroethylene) resin, the PFA (a copolymer of tetrafluoroethylene and perfluoroalkoxyethylene) resin, and the like is used. In other words, as the material of the tube 11, a material is used which is not only excellent in heat resistance and chemical resistance, but also capable of being elastically deformed such that the one end portion 12 can be flared to a certain extent.

Figure 5:
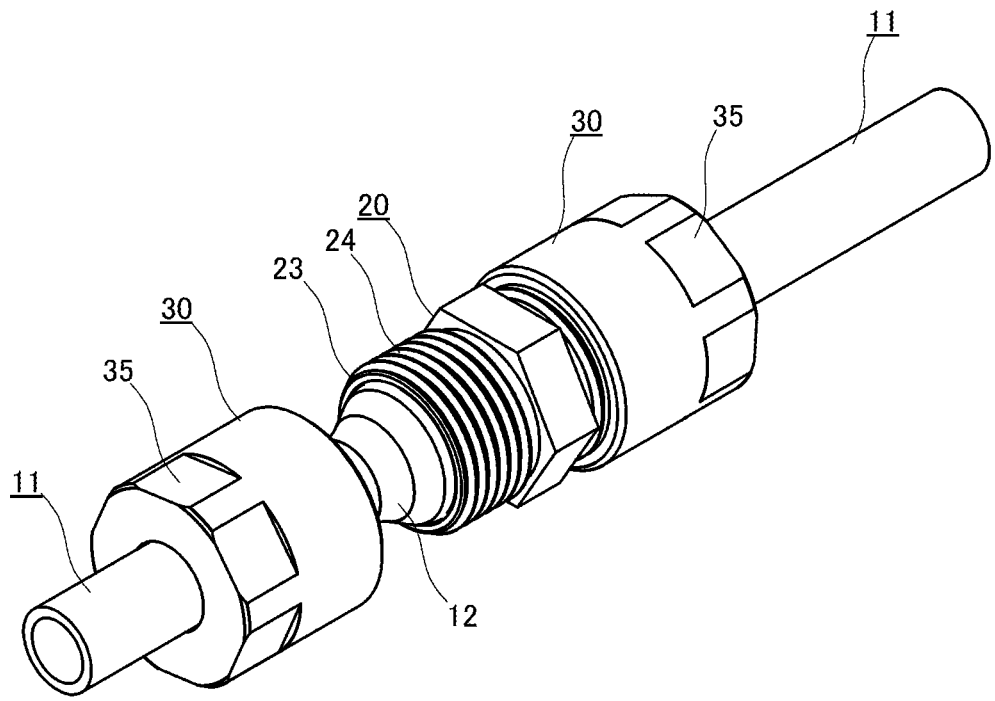
FIG. 5 is a perspective view showing an appearance of the tube coupling joint according to the first embodiment of the present invention.

As shown in FIG. 1 and FIG. 5, the ring 40 is a member which is previously press-fitted to the one end portion 12 of the tube 11 for holding the one end portion 12 in the flared state. In other words, the one end portion 12 of the tube 11 is coupled to the later described joint main body 20 through the ring 40. The ring 40 has an overall length slightly shorter than the length of a seal allowance between the tube 11 and the joint main body 20, and the inside diameter is set at a value which is the same as or slightly larger than the outside diameter of an inner cylindrical portion 22 of the joint main body 20.

More particularly, the ring 40 is formed so that it has a sectional geometry which provides the largest diameter on the central side of the outer periphery thereof rather than at both ends, specifically, in the sectional shape like that of a bead on a Japanese abacus. In other words, the ring 40 has an outer periphery formed in a tapered shape on either side of both ends thereof, being flared toward the central side, with the outer periphery on the central side of the ring 40 providing the largest diameter, i.e., a greatest wall thickness portion 41, extending over a predetermined length.

The ring 40 is positioned inside of the one end portion 12 of the tube 11, with the greatest wall thickness portion 41, which provides the largest diameter, being engaged with the one end portion 12 of the tube 11 with the ring 40 being press-fitted thereto so as to cut its way thereinto. As the material of the ring 40, for example, the PTFE (polytetrafluoroethylene) resin, which has the lowest coefficient of friction among the fluorocarbon resins which are excellent in frictional property, is used. However, the PTFE (polytetrafluoroethylene) resin has a low mechanical strength, and in order to prevent a shrinkage toward the bore of the tube 11, it was necessary to set the wall thickness of the ring 40 at a sufficiently large value.

Therefore, as an optimum material of the ring 40, it is recommended to use the PFA (a copolymer of tetrafluoroethylene & perfluoroalkoxyethylene) resin, which has the next lower coefficient of friction to that of the PTFE (polytetrafluoroethylene) resin, and a higher mechanical strength than that of the PTFE (polytetrafluoroethylene) resin. Besides this, the FEP (tetrafluoroethylene-hexafluoropropylene copolymer) resin, the ETFE (ethylene-tetrafluoroethylene copolymer) resin, the PVDF (polyvinylidene fluoride) resin, the ECTFE (ethylene chlorotrifluoroethylene) resin, and the PPS (polyphenylene sulfide) resin may be used.

Figure 6:
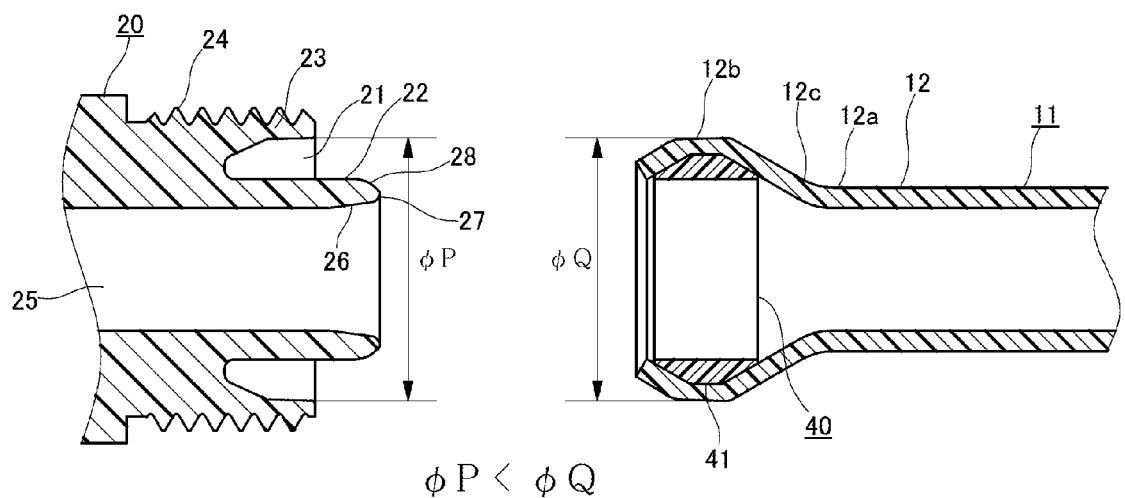
FIG. 6 is an explanatory drawing illustrating the relationship between the inside diameter of an outer cylindrical portion of the tube coupling joint according to the first embodiment of the present invention and the largest outside diameter of the one end portion of the tube which is flared by a greatest wall thickness portion of the ring.

As shown in FIG. 1, the one end portion 12 of the tube 11 is coupled to the later described joint main body 20, the ring 40 having been previously press-fitted thereto and flared. Herein, the one end portion 12 of the tube 11 that has been flared by the ring 40 is constituted by, as shown in FIG. 6, a bulged portion 12b, which has been flared along the outside diameter geometry of the ring 40 with respect to a base portion 12a, providing an original outside diameter, and a bent portion 12c, which is located between the base portion 12a and the bulged portion 12b, and where the flaring by the ring is brought to an end.

As shown in FIG. 1 and FIG. 2, the joint main body 20 has, on the one end portion side, an annular recessed groove 21, into which the flared one end portion 12 of the tube 11 is fitted; the inner cylindrical portion 22, which is inside of the recessed groove 21, and onto which the flared one end portion 12 of the tube 11 is fitted; and an outer cylindrical portion 23, which is outside the recessed groove 21, and into which the flared one end portion 12 of the tube 11 is fitted.

Herein, an external thread portion 24 is formed, ranging from the outer periphery of the outer cylindrical portion 23 to the basal end side of the joint main body 20. In addition, through the inside of the inner cylindrical portion 22, a thru-hole 25 penetrates in a screw axis direction, having substantially the same hole diameter as the inside diameter of the base portion 12a of the tube 11. As the material of the joint main body 20, as is the case with the tube 11, such a material as a fluorocarbon resin, which is excellent in chemical resistance, is suitable.

The inner cylindrical portion 22 is extended over a length longer than the overall length of the ring 40. The outer cylindrical portion 23 is extended toward the distal end side of the inner cylindrical portion 22 in parallel therewith from an innermost recess portion 21a of the recessed groove 21, however, the overall length of the outer cylindrical portion 23 is set at a value smaller than that of the inner cylindrical portion 22. Herein, the length of the outer cylindrical portion 23 is set such that the distal end portion of the outer cylindrical portion 23 covers at least the greatest wall thickness portion 41 of the ring 40 when the inner cylindrical portion 22 has been inserted into the ring 40 while the flared one end portion 12 of the tube 11 has been press-fitted to the innermost recess portion 21a of the recessed groove 21.

The outside diameter of the inner cylindrical portion 22 is set at a value which is the same as or slightly smaller than the inside diameter of the aforementioned ring 40. In addition, as shown in FIG. 6, an inside diameter ϕP of the outer cylindrical portion 23 is set at a value smaller than an outside diameter ϕQ of the bulged portion 12b, which is the largest outside diameter of the one end portion 12 of the tube 11 flared by the greatest wall thickness portion 41 of the ring 40. In other words, by tightening the later described cap nut 30 to the joint main body 20, the flared one end portion 12 of the tube 11 is press-fitted to the innermost recess portion of the recessed groove 21.

Figure 7:
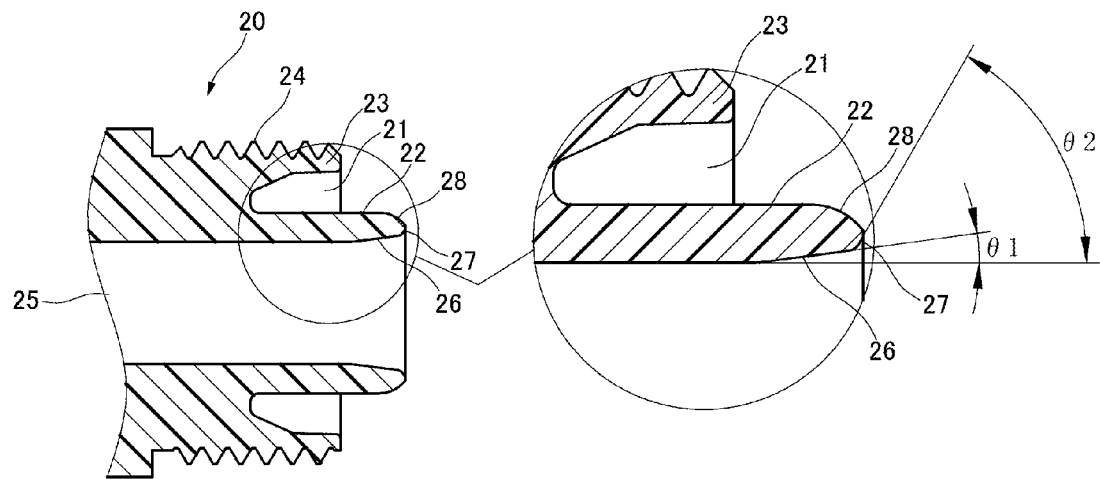
FIG. 7 is an explanatory drawing illustrating inclination angles of a first inner tapered portion and a second inner tapered portion of an inner cylindrical portion of the tube coupling joint according to the first embodiment of the present invention.

Further, as shown in FIG. 7, on the inner periphery side of the distal end portion of the inner cylindrical portion 22, there is provided a first inner tapered portion 26 which is formed by chamfering the inner cylindrical portion 22 by a thickness equal to an amount by which the distal end portion would be deformed toward the central axis with the cap nut 30 being tightened to the joint main body 20. Further, on the distal end side of the first inner tapered portion 26, there is provided a second inner tapered portion 27 inclined at an inclination angle $\theta_2$ equal to or larger than an inclination angle $\theta_1$ of the first inner tapered portion 26 for preventing residence of a fluid.

Figure 23:
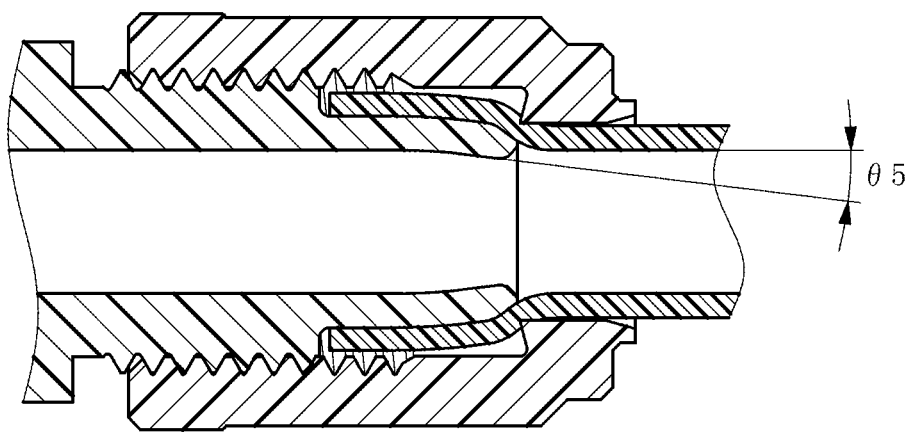
FIG. 23 is a critical portion sectional view for explaining the angle of deformation in the bore in the distal end portion of the joint main body in the conventional general tube coupling joint of flare type.

The relationship in inclination angle between the first inner tapered portion 26 and the second inner tapered portion 27 is $\theta_1 \leq \theta_2$, and the inclination angle $\theta_1$ of the first inner tapered portion 26 is set to meet the relationship of $3° \leq \theta_1 \leq 17°$. Herein, the proper range for the inclination angle $\theta_1$ has been determined based on the experimental data for the effectiveness of local deformation suppression, with the criteria therefor having been established as follows, on the basis of an angle $\theta_5$ by which the bore in the distal end portion of the joint main body of the conventional flare type tube coupling joint as shown in FIG. 23 has been deformed through the assembling operation.

In other words, in the case where the deformation angle $\theta_5$ was less than 1.5° ($\theta_5<1.5°$), an evaluation of "it is effective" for local deformation suppression was given to that inclination angle $\theta_1$, while, in the case where the deformation angle $\theta_5$ was equal to or larger than 1.5° ($\theta_5 \geq 1.5°$), an evaluation of "it is not effective" for local deformation suppression was given to that inclination angle $\theta_1$. The chart in FIG. 24 gives the experimental data obtained. According to this experimental data, it can be that, by setting the inclination angle $\theta_1$ of the aforementioned first inner tapered portion 26 at a value in the range of $3° \leq \theta_1 \leq 17°$, a desired effect for local deformation suppression can be obtained. The tube 11 is available in various sizes, however, in the experiment about the effectiveness for local deformation suppression, a tube of ϕ9.5×ϕ7.5 was adopted as a typical size of the tube 11.

Figure 8:
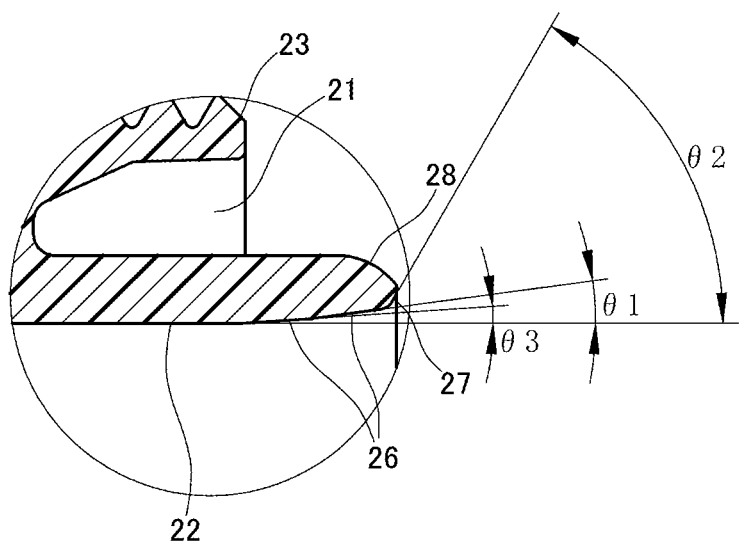
FIG. 8 is an explanatory drawing illustrating a modification where, in the tube coupling joint according to the first embodiment of the present invention, the first inner tapered portion of the inner cylindrical portion has been modified into that of a double tapered geometry.

Further, the tapered geometry of the first inner tapered portion 26 is not limited to the aforementioned single-tapered geometry, and may be a multiple-tapered one, such as a double- or triple-tapered one. Specifically, as shown in FIG. 8, even if the first inner tapered portion is provided with a double-tapered geometry by adding another tapered portion 26 (having an inclination angle of $\theta_3$) to the original first inner tapered portion 26 (having an inclination angle of $\theta_1$), occurrence of a local deformation in such a portion can be suppressed. In this case, the another tapered portion 26 (having an inclination angle of $\theta_3$), which is added, is disposed adjacent to the original first inner tapered portion 26 (having an inclination angle of $\theta_1$), and thus the inclination angle $\theta_3$ of the added tapered portion 26 is an angle smaller than the inclination angle $\theta_1$ of the original first inner tapered portion 26.

Figure 9:
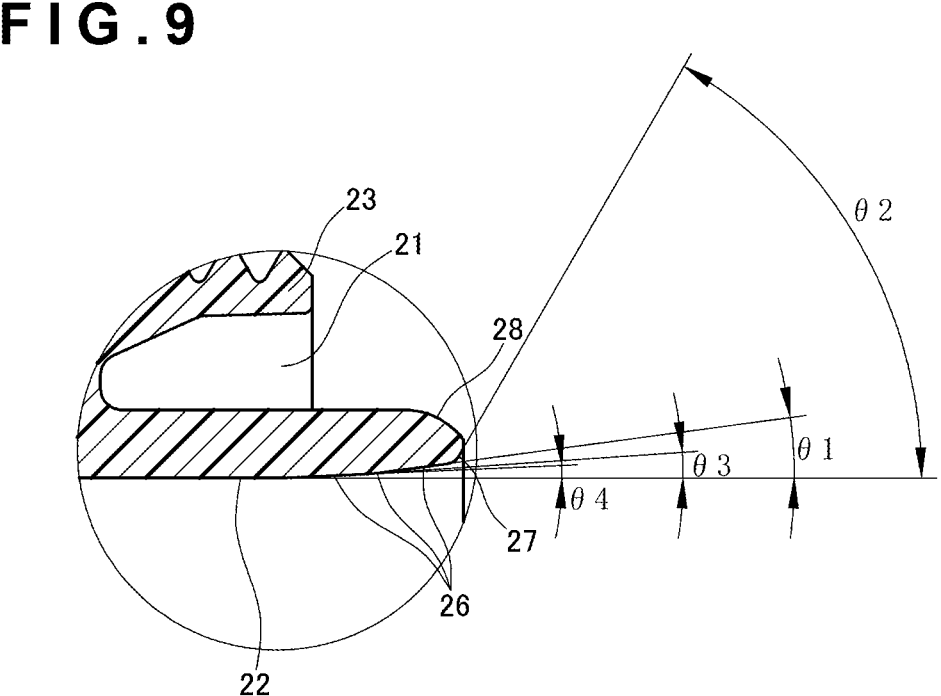
FIG. 9 is an explanatory drawing illustrating a modification where, in the tube coupling joint according to the first embodiment of the present invention, the first inner tapered portion of the inner cylindrical portion has been modified into that of a triple tapered geometry.

Furthermore, the first inner tapered portion 26 may be provided with a multiple-tapered geometry, for example, as shown in FIG. 9, it may be provided with a triple-tapered geometry by adding another tapered portion 26 (having an inclination angle of $\theta_4$) to the original first inner tapered portion 26 (having an inclination angle of $\theta_1$) besides the another tapered portion 26 (having an inclination angle of $\theta_3$). In this case, the relationship among the inclination angles will be $\theta_4<\theta_3<\theta_1$, starting at the $\theta_4$, which is provided for the innermost tapered portion 26. In this way, in the case where a tapered portion is newly added such that the first inner tapered portion 26 has a multiple-tapered geometry, the tapered portions are arranged, starting from the newly added tapered portion, which has the smallest inclination angle, and terminating at the tapered portion of the inclination angle $\theta_1$ of the original first inner tapered portion 26.

Further, from the viewpoint of preventing residence of a fluid, the specific inclination angle $\theta_2$ of the second inner tapered portion 27 is required to be an angle equal to or larger than the inclination angle $\theta_1$, which is the largest among the angles of the first inner tapered portion 26, as described above. If θ2=θ1, the first inner tapered portion 26 and the second inner tapered portion 27 are consecutive to each other, having the same angle, thereby a single inner tapered portion being formed.

By the way, in the case where the first inner tapered portion 26 is provided, the wall thickness of the distal end portion of the inner cylindrical portion 22 is reduced, which presents a new problem. The tube coupling joint 10 is generally designed such that the cap nut 30 is tightened to the joint main body 20 to press the tube 11, thereby generating a stress at the boundary face between the joint main body 20 and the tube 11, and thus preventing leakage and penetration of the internal fluid. Further, the higher such stress, the higher the ability of preventing leakage and penetration of the internal fluid.

However, as is the case with the tube coupling joint 10 according to the present embodiment, if the distal end portion of the inner cylindrical portion 22 of the joint main body 20 is provided with the first inner tapered portion 26, the wall thickness of the distal end portion being reduced, the deformation in a place where the wall thickness has been reduced is increased, thereby the stress at the boundary face between the joint main body 20 and the tube 11 is decreased. The tube coupling joint 10 according to the present embodiment is such a tube coupling joint that the first inner tapered portion 26 is provided to eliminate the convex geometry which can be an objection to the fluid, and yet the stress at the boundary face between the joint main body 20 and the tube 11 will not be decreased.

Figure 10:
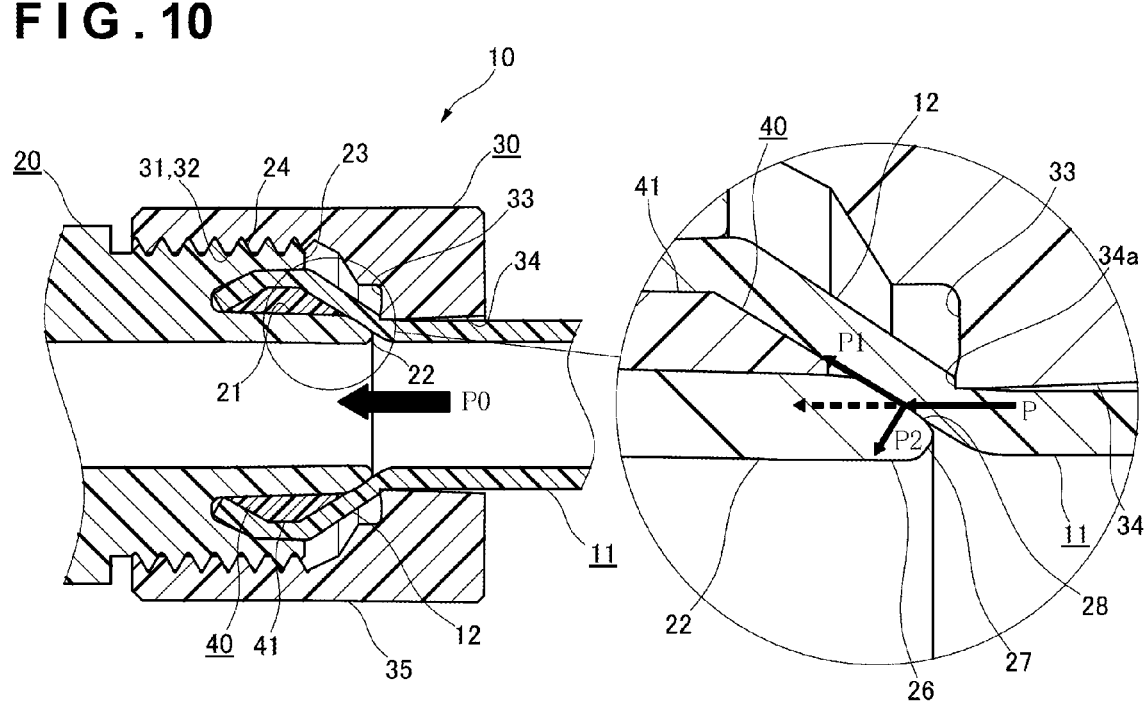
FIG. 10 is an explanatory drawing illustrating the directions in which the force components are applied to the outer tapered portion of the inner cylindrical portion in the tube coupling joint according to the first embodiment of the present invention.
Figure 11:
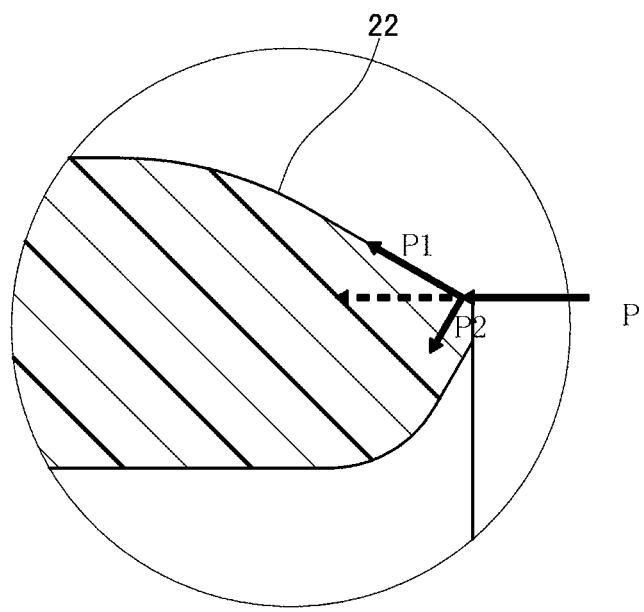
FIGS. 11(a) and 11(b) are explanatory drawings illustrating the resolution of a force in the outer tapered portion of the inner cylindrical portion in the tube coupling joint according to the first embodiment of the present invention.
Figure 11:
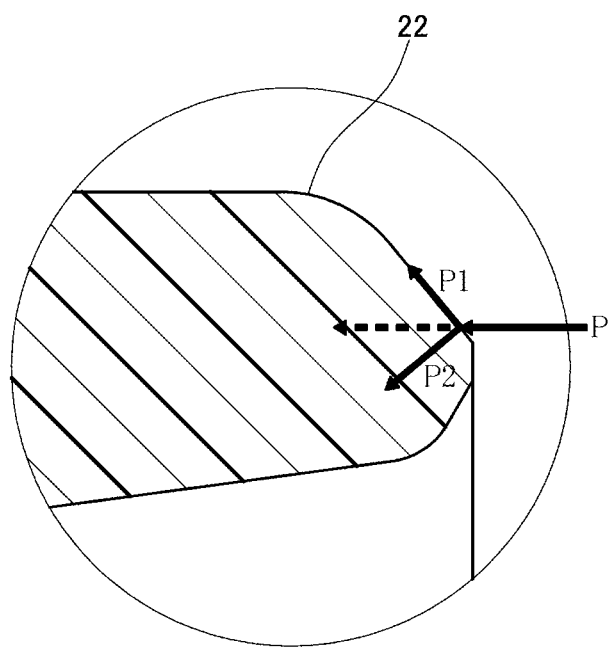

The specific method by which such stress will not be decreased is as follows. With the later described cap nut 30 being tightened to the joint main body 20, a force of P0 in the axial direction that is shown in FIG. 10 is generated. Assuming that, when this force P0 is resolved into components, one component of force is P, this force P0 is resolved into two components P1 and P2 at the surface of an outer tapered portion 28 provided on the outer periphery side of the distal end portion of the inner cylindrical portion 22, the component P1 being a force along the surface of the outer tapered portion 28 and the component P2 being that perpendicular to the surface of the outer tapered portion 28. The P2 of these two force components is equivalent to the stress at the boundary face between the joint main body 20 and the tube 11.

Therefore, it is found that, in order not to decrease the stress at the boundary face, a geometry which allows the force component P2 to be increased should be adopted. However, in the case where the cap nut 30 is tightened more heavily than is predetermined, the entire force P0 in the axial direction is increased, thereby the P being increased and the P1 and the P2, which are the components thereof, being also increased. And, with the force P0 in the axial direction being increased, the tightening torque required for tightening the cap nut 30 is also increased, thereby the workability in assembling the tube coupling joint 10 is substantially deteriorated. Then, for the tube coupling joint 10 according to the present embodiment, a geometry which can increase the P2 without increasing the P0 is adopted.

In other words, on the outer periphery side of the distal end portion of the inner cylindrical portion 22 of the joint main body 20, the outer tapered portion 28 to be pressure-contacted with the inner periphery of the bent portion 12c of the tube 11 for holding the airtightness after the cap nut 30 having been tightened to the joint main body 20 was provided, and the outer tapered portion 28 was formed to have a rounded sectional geometry. In order to increase the stress P2 in FIG. 11(a), the value of an angle of θ6 shown in FIG. 13 (the θ6 is an angle between the line in parallel with the axis line and a tangent line at the point p1 in the outer tapered portion 28 is increased, thereby the component P2 is increased on the relationship between the components P1 and P2. FIG. 11(a) is an enlarged view of the critical portion in FIG. 10, while FIG. 11(b) shows the critical portion in which the value of the angle of θ6 has been increased.

However, in the case where the outer tapered portion 28 is provided with a straight line sectional geometry rather than a rounded geometry, a force component of P2 the value of which is closer to that of the P0 is applied to the entire tapered portion, thereby the P0 in FIG. 10 being increased, and the tightening torque required for tightening the cap nut 30 being also increased. Herein, the stress required for preventing leakage and penetration of the inside fluid is not required for the entire outer tapered portion 28. In order to prevent leakage and penetration of a fluid, a high stress can be imposed on a portion in the vicinity of the distal end of the outer tapered portion 28 (a portion closer to the point p1 in FIG. 13) to thereby close up the inlet where the fluid gets in.

Figure 13:
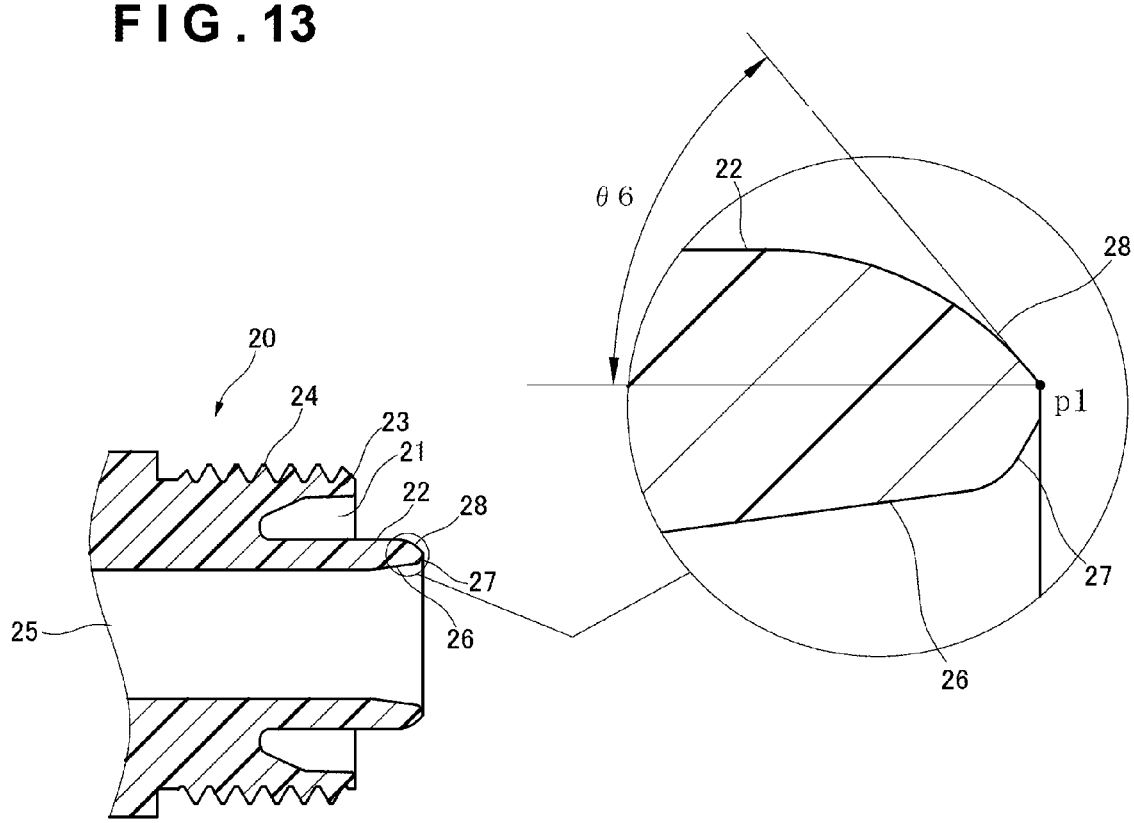
FIG. 13 is an explanatory drawing illustrating how to define the angle of the rounded sectional geometry in the outer tapered portion of the inner cylindrical portion in the tube coupling joint according to the first embodiment of the present invention.
Figure 14:
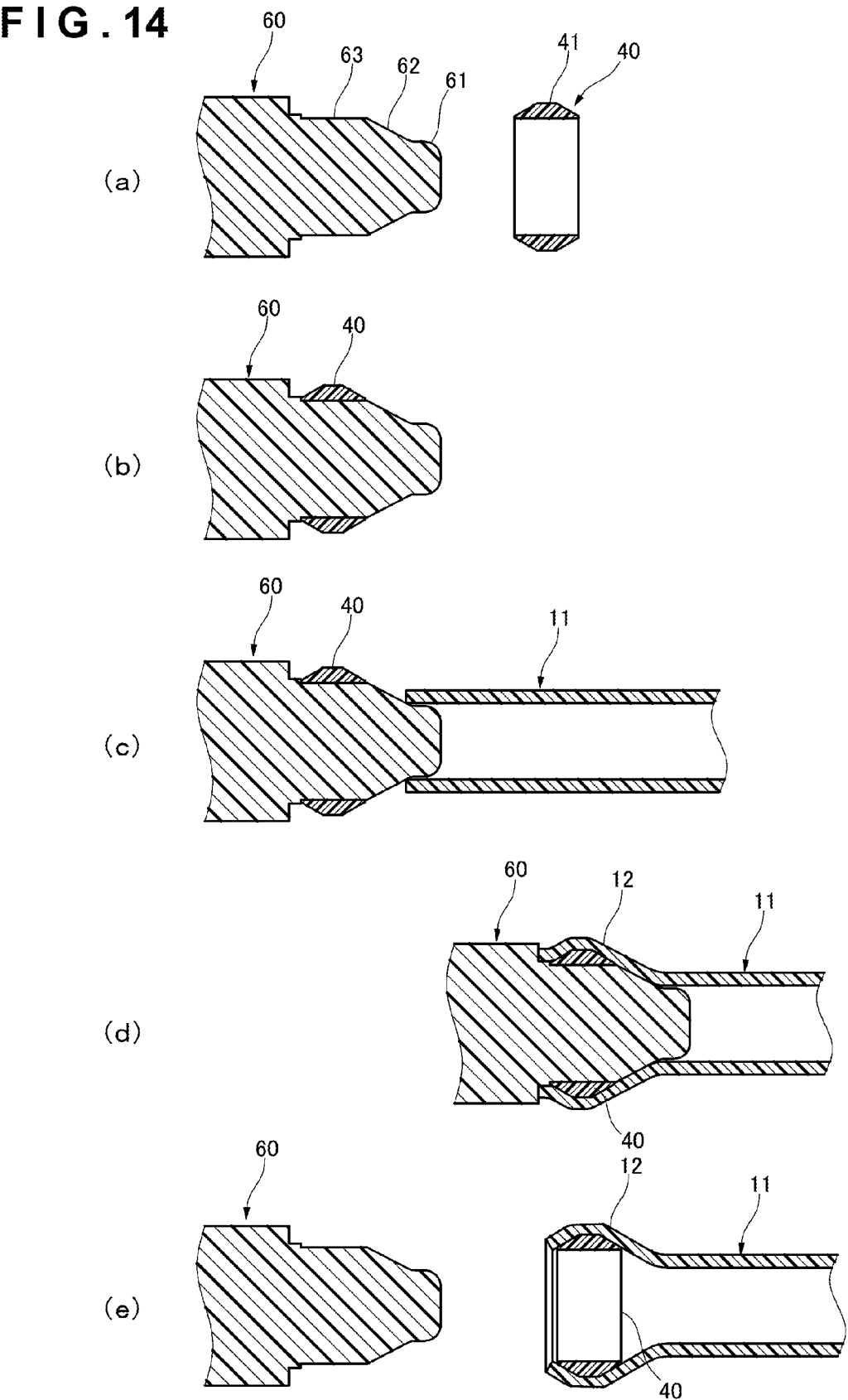
FIGS. 14(a) to 14(e) are explanatory drawings illustrating the steps in sequence for press-fitting the ring into the one end portion of the tube in the tube coupling joint while flaring it according to the first embodiment of the present invention.
Figure 15:
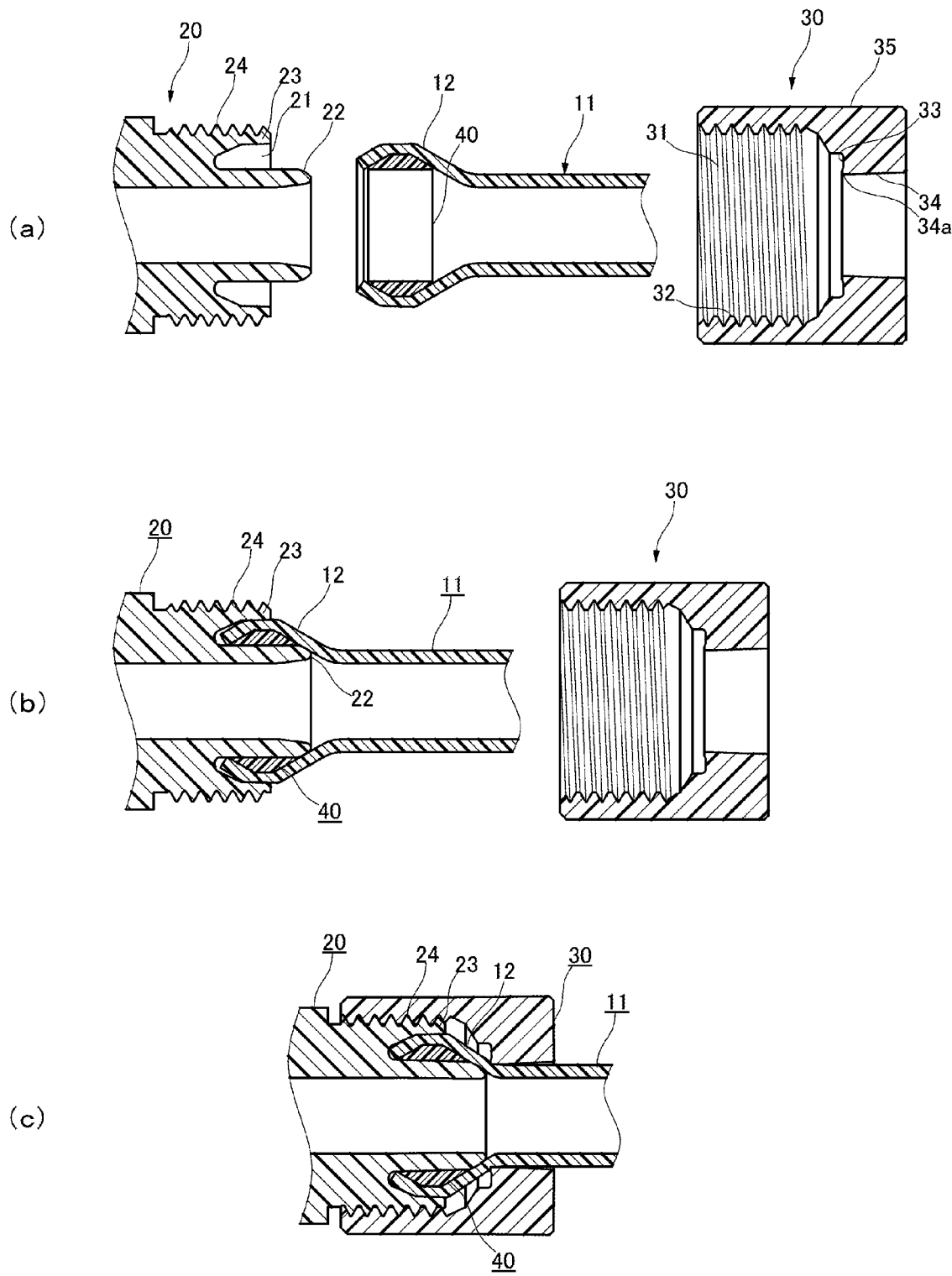
FIGS. 15(a) to 15(c) are explanatory drawings illustrating the steps in sequence for assembling the tube coupling joint according to the first embodiment of the present invention.

Then, in the case where the outer tapered portion 28 is provided with a rounded sectional geometry, in a portion in the vicinity of the distal end of the outer tapered portion 28 in FIG. 13 (a portion closer to the point p1), the value of an angle of θ6 (for a rounded geometry, the θ6 is defined as an angle between the tangent line at a point where the angle is to be measured and the line in parallel with the axis line) is increased, and as shown in FIG. 12, the more distant from the point p1, the smaller the θ6 will be. Thus, by providing the outer tapered portion 28 with a rounded sectional geometry, the closer to the point p1, the greater the value of θ6 and that of the force component P2 will be. Thereby, it becomes possible that, even if the necessary stress is imposed on a portion in the vicinity of the distal end, no unnecessary stress will be imposed on any other portions.

Since the force P0 in the axial direction shown in FIG. 10 is in a proportional relationship with the sum total of the force components P2, providing the outer tapered portion 28 with a rounded sectional geometry will decrease the value of P2 in a portion which is distant from the distal end, even if a sufficient force is applied to a point in the vicinity of the distal end of the outer tapered portion 28, and thus will allow the sum total of the force components P2 to be held to a small value, as compared to the case where the outer tapered portion 28 is a straight line sectional geometry. In this way, it has become possible to prevent leakage and penetration of the internal fluid without increasing the force P0 in the axial direction as a whole, and therefore without increasing the tightening torque of the cap nut 30.

Further, as shown in FIG. 5, in the outer periphery central portion of the joint main body 20, a tightening portion having a substantially hexagonal sectional geometry is provided. On the tightening portion, a tightening tool, such as a wrench, is fitted. With this tightening portion being disposed in the middle portion, also on the other end side of the joint main body 20, the recessed groove 21, the inner cylindrical portion 22, the outer cylindrical portion 23, and the external thread portion 24 are provided in the same manner as on the above-described one end side. In the joint main body 20, the thru-hole 25 communicates between the distal end portion of the inner cylindrical portion 22 on one end side thereof and the distal end portion of the inner cylindrical portion 22 on the other end side thereof.

As shown in FIG. 1, the cap nut 30 has a recess wall orthogonal to the screw axis in the innermost recess portion of a threaded hole 31 thereof so as to provide a bag-like portion. On the inlet side of the threaded hole of the cap nut 30, an internal thread portion 32 is provided, and in the recess wall 33, an insertion hole 34 for penetrating the tube 11 is drilled.

Further, on the outer periphery of the cap nut 30, a tightening portion 35 having a substantially hexagonal sectional geometry (FIG. 5 to be referenced) is provided such that a nut tightening tool, such as a wrench, is fitted on the tightening portion 35.

Further, as shown in FIG. 1, a hole peripheral edge 34a of the insertion hole 34 is jutted out in a mountain-shaped sectional shape which is inclined toward the inlet of the threaded hole 31 while being directed toward the central axis (the screw axis). This hole peripheral edge 34a provides a portion which is to be pressure-contacted with the bent portion 12c of the one end portion 12 of the tube 11. In other words, the bent portion 12c of the tube 11 is sandwiched between the hole peripheral edge 34a of the insertion hole 34 and the outer tapered portion 28 in the distal end portion of the inner cylindrical portion 22. As a specific material for the cap nut 30, such a material as a fluorocarbon resin is suitable, as is the case with the tube 11 and the joint main body 20.

Next, the function of the embodiment of the present invention will be explained.

Figure 21:
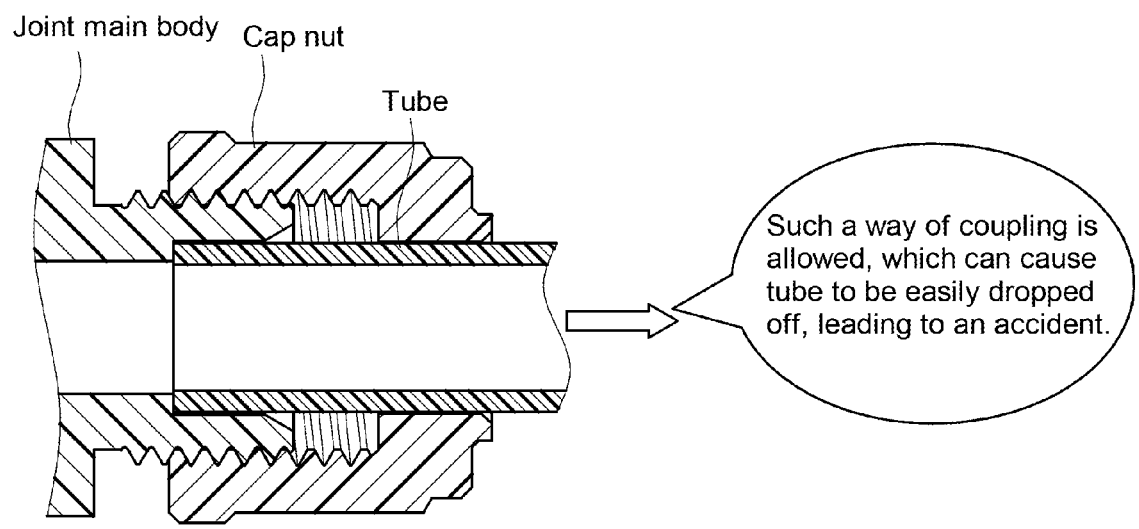
FIG. 21 is a critical portion sectional view for explaining a problem with the conventional general tube coupling joint of inner ring type.
Figure 22:
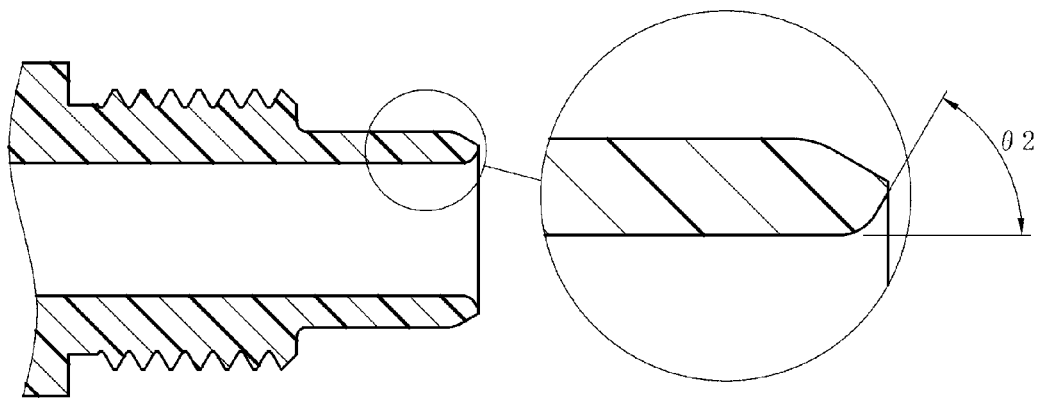
FIG. 22 is a critical portion sectional view illustrating a tapered portion provided for the bore in the distal end portion of the joint main body in the conventional general tube coupling joint of flare type.

As shown in FIG. 1, the tube coupling joint 10 is configured to have a geometry of flare type as its basic type of geometry. This is because, if the tube coupling joint 10 is configured to have a geometry of inner ring type, it would be difficult to prevent penetration of a fluid, and suppress occurrence of a pressure drop of the fluid. In addition, by configuring the tube coupling joint 10 to have a geometry of flare type as its basic type of geometry, the possibility of an accident which would be caused if the ring 40 is not inserted as shown in FIG. 21 can be eliminated. This is because, if the tube 11 is not flared, it cannot be mounted, and if it is flared and mounted, no problems will be caused.

The tube coupling joint 10 is configured to have a geometry of flare type as its basic type of geometry, however, it features the use of the ring 40 for flaring the tube 11, and thus while it is of flare type, it is only required to press-fit such ring 40 into the tube 11 once for completion of the tube processing, i.e., there is no need for flaring the one end portion 12 of the tube 11 many times, whereby the assemblability is improved. In addition, the use of the ring 40 provides another advantage that, even when a tensile load is imposed on the tube 11, the ring 40 prevents it from coming off, thereby the tensile strength of the tube 11 being enhanced.

By the way, with the conventional inner ring type, the inside diameter portion of the ring provides a flow path for the fluid after the tube coupling joint being assembled. In this case, by setting the inside diameter of the ring at a value which is the same as the tube inside diameter, it was possible to avoid occurrence of a pressure drop of the fluid. Contrarily to this, with the tube coupling joint 10 according to the present embodiment, the inner cylindrical portion 22 of the joint main body 20 is disposed inside of the ring 40, thereby the inside diameter portion of the inner cylindrical portion 22 provides a flow path for the fluid.

Therefore, in order to avoid occurrence of a pressure drop of the fluid, it is required to make the inside diameter of the inner cylindrical portion 22 to be the same as the inside diameter of the tube 11, and in order to prevent the flared tube 11 from being shrunk in a direction toward the bore thereof, it is required to provide the ring 40 with a wall thickness larger than a certain value. Accordingly, as compared to the outside diameter of the conventional the ring, that of the ring 40 which is proposed with this disclosure is large. If the ring 40 has a large outside diameter, insertion of the ring 40 into the bore of the tube 11 will impose a large load on the tube 11, thereby there was the possibility that the tube 11 may be buckled, resulting in the ring 40 being unable to be inserted.

In order to avoid occurrence of such buckling of the tube 11, it is required to reduce the load on the tube 11 as much as possible. This can be implemented by reducing the outside diameter of the ring 40 as much as possible so long as the tube 11 is prevented from being shrunk toward the bore thereof, and manufacture the ring 40 using a material having a low coefficient of friction to reduce the frictional force to be applied to the tube 11. Then, for the ring 40, it is a prerequisite to use a PFA (a copolymer of tetrafluoroethylene & perfluoroalkoxyethylene) resin, or the like, as described above.

Further, it is required to set the outside diameter of the ring 40 as follows. Specifically, an outside diameter φB of the ring 40 in FIG. 16 is set to meet the following expressions:

$$\phi B = (m \times t) + \phi A$$

$$2 < m \leq 4$$

Further, a length C of the ring 40 is set at a value in the following range:

$$3 \text{ mm} \leq C \leq 12 \text{ mm}$$

Further, a taper angle E of the ring 40 is set at a value in the following range:

$$20° \leq E \leq 35°$$

If the above relational expressions are met, it is possible to insert the ring 40 into the bore in the one end portion 12 of the tube 11, and to insert the one end portion 12 of the flared tube 11 into the recessed groove 21 in the joint main body 20.

If the above relationships are not met, there is the possibility that, in inserting the ring 40 into the bore of the one end portion 12 of the tube 11, the tube 11 may cause buckling, and there is a high possibility that, even if the tube 11 could have been inserted into the bore of the one end portion 12 of the tube 11, a large amount of shrinkage of the one end portion 12 of the tube 11 toward the bore thereof may be caused, resulting in insertion of the one end portion 12 of the tube 11 into the recessed groove 21 of the joint main body 20 being difficult.

FIGS. 14(a) to 14(e) illustrate the steps for press-fitting the ring 40 into the one end portion 12 of the tube 11 while flaring it. In such a step, a jig 60 as a ring insertion tool is used. As shown in FIG. 14(a), the jig 60 is constituted by a small diameter portion 61, which is smaller in diameter than the bore of the tube 11, a flaring portion 62, which is gradually flared from the small diameter portion 61, and a ring holding portion 63 which follows the flaring portion 62, having a diameter large enough to enlarge the bore of the tube 11 until it has a diameter sufficiently large to permit it to be fitted onto the inner cylindrical portion 22 of the joint main body 20. As the material for the jig 60, a PTFE (polytetrafluoroethylene) resin, which has the lowest coefficient of friction among the fluorocarbon resins which are excellent in friction property, is suitable.

First, as shown in FIG. 14(b), the ring 40 is inserted to the ring holding portion 63 of the jig 60. Then, as shown in FIG. 14(c), the tube 11 is fixed to the jig 60 so as to be concentric therewith. At this time, the one end portion 12 of the tube 11 is positioned in the state in which it is fitted onto the small diameter portion 61 of the jig 60. In such a state, as shown in FIG. 14(d), the jig 60 is moved toward the tube 11 to force the jig 60 and the ring 40 into the inside of the tube 11.

Thereafter, as shown in FIG. 14(e), the jig 60 is moved away from the tube 11 to thereby engage the greatest wall thickness portion 41 of the ring 40 with the bore of the tube 11, and to cause it to be positioned and held within the one end portion 12 of the tube 11 by the shrinking force of the tube 11 toward the bore thereof. In such a step for press-fitting the ring 40, there is no need for heating the one end portion 12 of the tube 11, and simply by press-fitting the jig 60 into the one end portion 12 of the tube 11, the ring 40 can be fitted into the one end portion 12 of the tube 11 while flaring it.

FIGS. 15(a) to 15(c) illustrate the steps for assembling the tube coupling joint 10. In such a step, as shown in FIG. 15(a), the joint main body 20, the tube 11, the one end portion 12 of which has been flared by the ring 40, and the cap nut 30 are arranged concentrically with one another, and as shown in FIG. 15(b), the inner cylindrical portion 22 of the joint main body 20 is inserted into the ring 40, while the flared one end portion 12 of the tube 11 is press-fitted into the recessed groove 21 of the joint main body 20 to the innermost recess portion thereof. At this time, there is brought about a state in which the outer cylindrical portion 23 of the joint main body 20 covers the greatest wall thickness portion 41 of the ring 40.

In such a state, as shown in FIG. 15(c), the internal thread portion 32 of the cap nut 30 is screwed with the external thread portion 24 of the joint main body 20, and is tightened to a predetermined position, thereby assembling of the tube coupling joint 10 being completed. With the tube coupling joint 10 which has been assembled, there is brought about a state in which the greatest wall thickness portion 41 of the ring 40 is pressed against the inner cylindrical portion 22 together with the one end portion 12 of the tube 11 through the outer cylindrical portion 23 of the joint main body 20 that is provided with the external thread portion 24, and the hole peripheral edge 34a of the insertion hole 34 in the cap nut 30 is pressure contacted with the bent portion 12c of the tube 11, where the flaring by the ring 40 is brought to an end.

In this way, as shown in FIG. 1, the gap between any two portions adjacent to each other of the distal end portion of the inner cylindrical portion 22 of the joint main body 20, the hole peripheral edge 34a of the insertion hole 34 in the cap nut 30, and the bent portion 12c of the tube 11 is removed to provide a sufficiently tight contact state, whereby the tube 11 can be rigidly coupled and fixed to the joint main body 20.

Especially, since the greatest wall thickness portion 41 of the ring 40, the one end portion 12 of the tube 11, and in addition the outer cylindrical portion 23 of the joint main body 20 are overlapped one another on the inner cylindrical portion 22 in the axial direction, and thus even when a vibration is applied to the joint main body 20, or a tensile force is applied to the tube 11, the ring 40 and the tube 11 can be sufficiently prevented from being displaced, whereby the seal performance can be stabilized, and the tensile strength of the tube 11 can be enhanced.

Further, with the cap nut 30, the hole peripheral edge 34a of the insertion hole 34 is jutted out in a mountain-shaped sectional shape which is inclined toward the inlet of the threaded hole 31 while being directed toward the central axis. Therefore, with the internal thread portion 32 of the cap nut 30 being screwed with the external thread portion 24 of the joint main body 20, the hole peripheral edge 34a is pressure-contacted with the bent portion 12c of the tube 11 so as to cut its way thereinto, the bent portion 12c being rigidly sandwiched between the hole peripheral edge 34a and the outer tapered portion 28 of the inner cylindrical portion 22. Thereby, the tensile strength of the tube 11 with respect to the joint main body 20 is further increased, whereby the tube 11 can be more positively prevented from accidentally coming off.

Herein, by providing the outer tapered portion 28 on the distal end side of the inner cylindrical portion 22 with a rounded sectional geometry, it becomes possible to prevent leakage and penetration of the fluid inside the joint, especially, between the distal end portion of the inner cylindrical portion 22 and the bent portion 12c of the tube 11 without increasing the force P0 in the axial direction in FIG. 10, and therefore without increasing the tightening torque of the cap nut 30.

In addition, as described above, if the inner cylindrical portion 22 of the joint main body 20 is locally deformed in a direction toward the bore center of the thru-hole 25, the flow of the fluid is hindered by the deformation, however, by providing the first inner tapered portion 26, the inner cylindrical portion 22, even when locally deformed toward the bore, will not form a convex by which the flow of the fluid is hindered.

In this way, by providing the first inner tapered portion 26 and the second inner tapered portion 27, occurrence of a local convex bulge which will obstruct the flow of the fluid can be suppressed together with penetration of the fluid and liquid residence being prevented. The tapered geometry of the first inner tapered portion 26 is not limited to a single-tapered one, and may be a multiple-tapered geometry, such as a double- or triple-tapered one.

Further, as shown in FIG. 6, the inside diameter $\phi P$ of the outer cylindrical portion 23 is set at a value smaller than the outside diameter $\phi Q$ of the bulged portion 12b, which is the largest outside diameter of the one end portion 12 of the tube 11 flared by the greatest wall thickness portion 41 of the ring 40. Thus, by tightening the cap nut 30 to the joint main body 20, the flared one end portion 12 of the tube 11 is press-fitted to the innermost recess portion of the recessed groove 21. Thereby, the seal performance can be further stabilized to enhance the airtightness.

Figure 17:
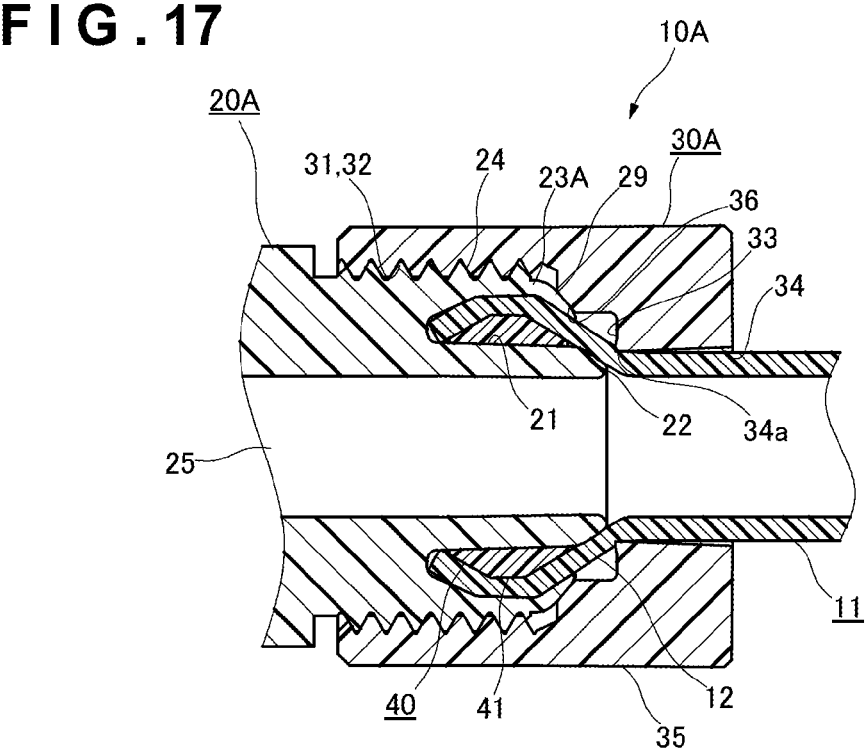
FIG. 17 is a critical portion sectional view illustrating a tube coupling joint according to a second embodiment of the present invention.
Figure 18:
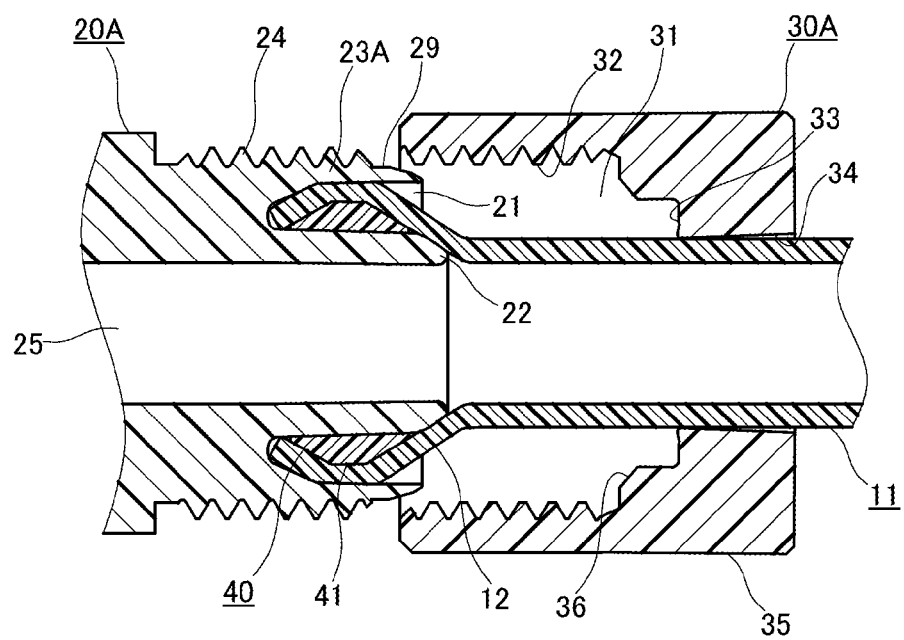
FIG. 18 is a critical portion sectional view illustrating the tube coupling joint according to the second embodiment of the present invention while being assembled.
Figure 19:
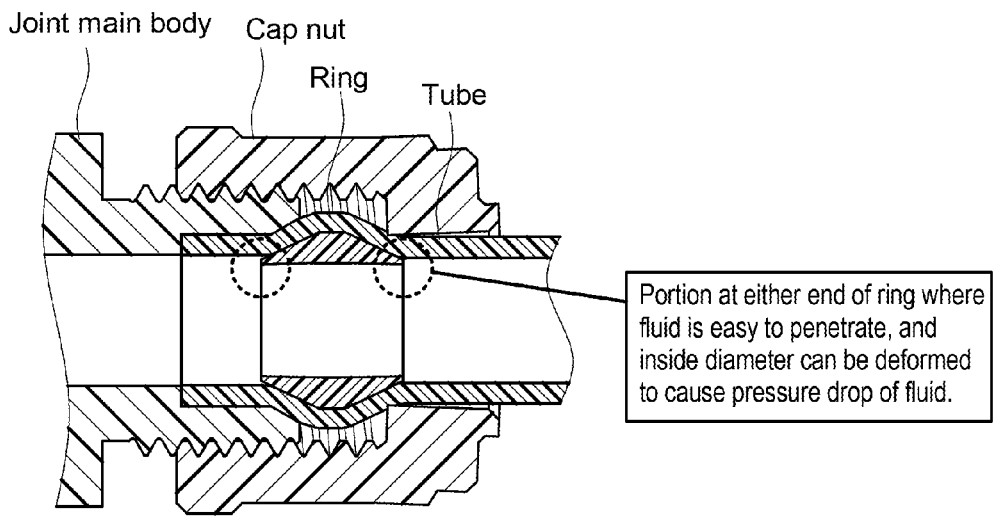
FIG. 19 is a critical portion sectional view illustrating a typical example of a conventional general tube coupling joint of inner ring type.
Figure 20:
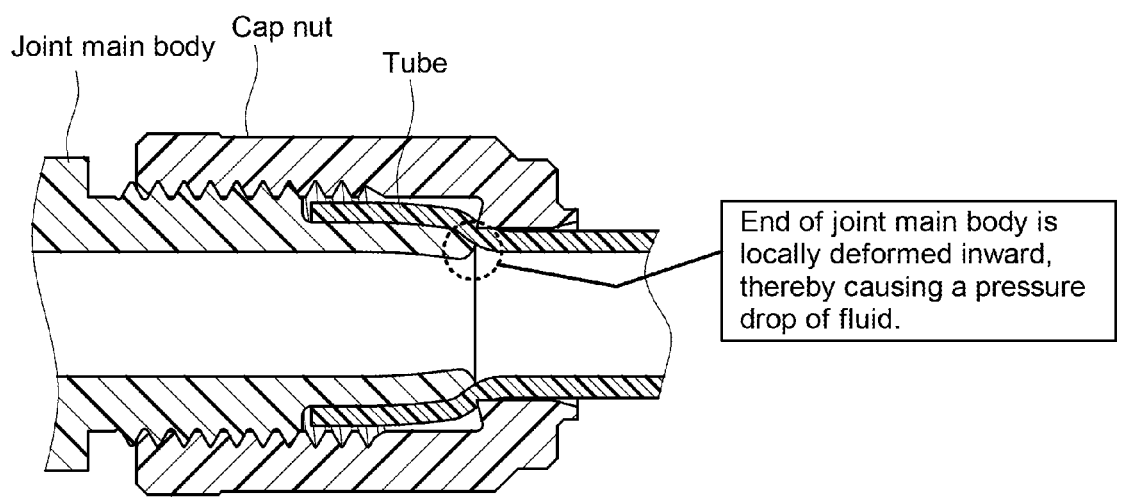
FIG. 20 is a critical portion sectional view illustrating a typical example of a conventional general tube coupling joint of flare type.

FIG. 17 and FIG. 18 show a second embodiment of the present invention.

A tube coupling joint 10A of the present embodiment is similar, in basic configuration, to the tube coupling joint 10 according to the first embodiment as described above, except that an outer cylindrical portion 23A of a joint main body 20A is different in specific configuration. FIG. 17 is a critical portion sectional view illustrating the tube coupling joint 10A according to the present embodiment, and FIG. 18 is a critical portion sectional view illustrating the tube coupling joint 10A while being assembled. A cap nut 30A in FIG. 18 is shown as a sectional end view.

With the tube coupling joint 10A according to the present embodiment, the outer cylindrical portion 23A of the joint main body 20A is formed such that, when the inner cylindrical portion 22 of the joint main body 20A has been inserted into the ring 40 while the flared one end portion 12 of the tube 11 has been press-fitted to the innermost recess portion of the recessed groove 21, a distal end portion 29 extends to a position where it covers the entire ring 40, getting over the greatest wall thickness portion 41 of the ring 40 as shown in FIG. 17.

Thus, the entire one end portion 12 of the tube 11 flared by the ring 40 is covered by the outer cylindrical portion 23A of the joint main body 20A so as to be surrounded thereby. In other words, when the internal thread portion 32 of the cap nut 30A is screwed with the external thread portion 24 of the joint main body 20A in the state as shown in FIG. 18, a projected annular area 36 provided around the recess wall 33 of the cap nut 30A presses the distal end portion 29 of the outer cylindrical portion 23A against the one end portion of the ring 40.

As a result of this, as shown in FIG. 17, the inlet of the recessed groove 21 is narrowed to be blocked, resulting in the one end portion 12 of the tube 11 that has been flared by the ring 40 being confined in the recessed groove 21, whereby the seal performance and the tensile strength can be further enhanced. Note that any portion which is essentially the same as a particular portion in the first embodiment is provided with the same numeral, and repeated explanation thereof will be omitted here.

Heretofore, the embodiments of the present invention have been described with reference to the drawings, however, the specific configuration is not limited to that of the above-described embodiments, and various changes and modifications may be included in the present invention, so long as they do not depart from the spirit and scope thereof. For example, in the first embodiment, the inner cylindrical portion 22 and the outer cylindrical portion 23 on the one end side of the joint main body 20 and those on the other end side are formed to have the same diameter, respectively, however, may be formed to have a different diameter, respectively. In addition, the inner cylindrical portion 22 and the outer cylindrical portion 23 at both ends are concentrically arranged, however, in the case where the thru-hole 25 is bent in the shape of the letter L, they may be configured so as to be arranged in an orthogonal direction, respectively, or in the case where the thru-hole 25 is formed in the shape of the letter T, they may be configured so as to be arranged in the shape of the letter T, respectively.

INDUSTRIAL APPLICABILITY

The tube coupling joint according to the present invention is used as means for coupling tubes to one another that provide flow paths for any fluids including ultrapure water, which is handled in various processes, such as those for semiconductor manufacturing, liquid crystal manufacturing, medical supply/pharmaceutical manufacturing, food processing, and the like, and fluids dangerous to human bodies, such as sulfuric acid and hydrochloric acid.

REFERENCE SIGNS LIST

10: Tube coupling joint
10A: Tube coupling joint
11: Tube
12: One end portion
12a: Base portion
12b: Bulged portion
12c: Bent portion
20: Joint main body
20A: Joint main body
21: Recessed groove
21a: Innermost recess portion
22: Inner cylindrical portion
23: Outer cylindrical portion
23A: Outer cylindrical portion
24: External thread portion
25: Thru-hole
26: First inner tapered portion
27: Second inner tapered portion
28: Outer tapered portion
29: Distal end portion
30: Cap nut
30A: Cap nut
31: Threaded hole
32: Internal thread portion
33: Recess wall
34: Insertion hole
34a: Hole peripheral edge
35: Tightening portion
36: Projected annular area
40: Ring
41: Greatest wall thickness portion
60: Jig
61: Small diameter portion
62: Flaring portion
63: Ring holding portion

The invention claimed is:

1. A tube coupling joint (10, 10A), comprising:
a ring (40) being press-fitted into one end portion (12) of a tube (11) for holding the one end portion (12) in an expanded state, the one end portion (12) of the tube (11) being coupled to a joint main body (20, 20A), and with the tube (11) having been passed therethrough, a cap nut (30, 30A) surrounding said one end portion (12) being tightened to the joint main body (20, 20A) for fixing the tube (11) to the joint main body (20, 20A),
said cap nut (30, 30A) comprising a hole (31) for accommodating the one end portion (12) of said tube (11);
an internal thread portion (32) formed on an inner periphery of the hole (31);
a recess wall (33) provided in an innermost recess portion of the hole (31); and
an insertion hole (34) penetrating through the recess wall (33) for passing said tube (11) therethrough,
said joint main body (20, 20A) comprising, on one end portion side thereof where said cap nut (30, 30A) is to be tightened, a recessed groove (21) for fitting the one end portion (12) of said tube (11) thereinto;
an inner cylindrical portion (22) provided inside of the recessed groove (21) for fitting the one end portion (12) of said tube (11) thereonto;
an outer cylindrical portion (23, 23A) provided outside of the recessed groove (21) for fitting the one end portion (12) of said tube (11) thereinto;
an external thread portion (24) formed on an outer periphery of the outer cylindrical portion (23, 23A) to be screwed with said internal thread portion (32); and
a thru-hole (25) provided inside of said inner cylindrical portion (22) so as to penetrate therethrough in a screw axial direction, having substantially the same hole diameter as the inside diameter of said tube (11),
wherein, on an inner periphery side of a distal end portion of said inner cylindrical portion (22), there are provided a first inner tapered portion (26) which is formed by chamfering the inner cylindrical portion (22) by a thickness equal to an amount by which the distal end portion would be deformed toward a central axis with said cap nut (30, 30A) being tightened to the joint main body (20, 20A), and a second inner tapered portion (27) inclined, on a distal end side of the first inner tapered portion (26), at an angle equal to or larger than an inclination angle of the first inner tapered portion (26) for preventing a fluid to be transported from being stalled,
said ring (40) is formed in a sectional geometry providing a largest diameter of an outer periphery thereof on a central side rather than at both ends, and being positioned with a greatest wall thickness portion (41), providing the largest diameter, being engaged with an inner periphery of the one end portion (12) of said tube (11) with the ring (40) being press-fitted thereto, and
upon the inner cylindrical portion (22) of said joint main body (20, 20A) having been inserted into said ring (40) while the one end portion (12) of said tube (11) having been press-fitted to an innermost recess portion of said recessed groove (21), said outer cylindrical portion (23, 23A) covers at least the greatest wall thickness portion (41) of said ring (40), and in this state, with the internal thread portion (32) of said cap nut (30, 30A) being screwed with the external thread portion (24) of said joint main body (20, 20A), the greatest wall thickness portion (41) of said ring (40) and the one end portion (12) of the tube (11) being pressed against said inner cylindrical portion (22) by said outer cylindrical portion (23, 23A), and a hole peripheral edge (34a) of the insertion hole (34) in said cap nut (30, 30A) being pressure-contacted with a bent portion (12c) of the tube (11).

2. The tube coupling joint (10A) according to claim 1, wherein the outer cylindrical portion (23A) of said joint main body (20A) is formed such that, upon the inner cylindrical portion (22) of said joint main body (20A) having been inserted into said ring (40) while the one end portion (12) of said tube (11) having been press-fitted to an innermost recess portion of said recessed groove (21), a distal end portion (29) extends to a position where it covers the entire ring (40), getting over the greatest wall thickness portion (41) of said ring (40), and said cap nut (30A) has a projected annular area (36) around said recess well (33) protruding toward the central axis and the inlet of said hole (31), and upon the cap nut (30A) being tightened to the joint main body (20A), presses a distal end portion (29) of said outer cylindrical portion (23A) against the one end portion of said ring (40).

3. The tube coupling joint (10, 10A) according to claim 1, wherein a hole peripheral edge (34a) of the insertion hole (34) in said cap nut (30, 30A) protrudes toward the central axis and the inlet of said hole (31), and a bent portion (12c) of said tube (11) is sandwiched between the hole peripheral edge (34a) of said insertion hole (34) and the distal end portion of said inner cylindrical portion (22).

4. The tube coupling joint (10, 10A) according to claim 1, wherein an inside diameter of the outer cylindrical portion (23, 23A) of said joint main body (20, 20A) is set at a value smaller than the largest outside diameter of the one end portion (12) of said tube (11) flared by the greatest wall thickness portion (41) of said ring (40), and by tightening said cap nut (30, 30A) to the joint main body (20, 20A), the one end portion (12) of said tube (11) is press-fitted to an innermost recess portion of said recessed groove (21).

5. The tube coupling joint (10, 10A) according to claim 1, wherein, on an outer periphery side of a distal end portion of the inner cylindrical portion (22) of said joint main body (20, 20A), there is provided an outer tapered portion (28) which, by tightening said cap nut (30, 30A) to the joint main body (20, 20A), is pressure-contacted with an inner periphery of the bent portion (12c) of said tube (11), and the outer tapered portion (28) is formed in a rounded sectional geometry.

* * * * *